(12) United States Patent
Nakashima et al.

(10) Patent No.: US 6,547,275 B2
(45) Date of Patent: *Apr. 15, 2003

(54) AIR BAG GAS GENERATOR AND AIR BAG DEVICE

(75) Inventors: Yoshihiro Nakashima, Himeji (JP); Nobuyuki Ohji, Himeji (JP)

(73) Assignee: Daicel Chemical Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/554,123

(22) PCT Filed: Nov. 30, 1999

(86) PCT No.: PCT/JP99/06701

§ 371 (c)(1),
(2), (4) Date: Jul. 10, 2000

(87) PCT Pub. No.: WO00/32446

PCT Pub. Date: Jun. 8, 2000

(65) Prior Publication Data

US 2002/0167155 A1 Nov. 14, 2002

(30) Foreign Application Priority Data

Nov. 30, 1998 (JP) ............................................. 10-339934
Mar. 23, 1999 (JP) ............................................. 11-078306
Nov. 29, 1999 (JP) ............................................. 11-338174

(51) Int. Cl.⁷ .............................................. B60R 21/26
(52) U.S. Cl. ...................................... 280/736; 280/742
(58) Field of Search ................................ 280/736, 740, 280/741, 742

(56) References Cited

U.S. PATENT DOCUMENTS

| 3,877,882 A | | 4/1975 | Lette et al. |
| 3,934,984 A | * | 1/1976 | Marlow et al. ............... 23/281 |
| 3,972,545 A | | 8/1976 | Kirchoff et al. |
| 4,886,293 A | | 12/1989 | Weiler et al. |
| 4,950,458 A | | 8/1990 | Cunningham |

(List continued on next page.)

FOREIGN PATENT DOCUMENTS

| DE | 135005 C | 1/1902 |
| DE | 4019677 A1 | 1/1992 |
| DE | 4141620 A | 7/1992 |
| DE | 19520847 A | 12/1996 |

OTHER PUBLICATIONS

"Variable Output Initiator," Research Disclosure, GB, Industrial Opportunities Ltd. Havant, No. 384, Apr. 1, 1996, pp. 239–240.

(List continued on next page.)

*Primary Examiner*—Paul N. Dickson
*Assistant Examiner*—Deann Draper
(74) *Attorney, Agent, or Firm*—Birch, Stewart, Kolasch & Birch, LLP

(57) ABSTRACT

A gas generator small in size and which can be produced easily with a simple structure is provided. The output of a gas generator is equalized so that an occupant can be safely restrained, and the combustion performance can be stably adjusted. The gas generator comprises a housing forming an outer shell container and accommodating two or more ignition units to ignite upon an impact and two or more gas generating agents which are independently ignited and burnt by the ignition units to generate a combustion gas for inflating an air bag, and a plurality of gas discharge ports which are formed in the housing, wherein the gas discharge ports are closed by sealing units for maintaining an internal pressure of the housing to the given pressure, a breaking pressure for breaking the sealing units is adjusted in multiple stages by controlling gas discharge ports and/or sealing units, and a difference of the maximum internal pressures in the housing at activation of the respective igniters is suppressed.

39 Claims, 14 Drawing Sheets

U.S. PATENT DOCUMENTS

| | | | |
|---|---|---|---|
| 4,998,751 A | | 3/1991 | Paxton et al. |
| 5,009,855 A | | 4/1991 | Nilsson |
| 5,017,147 A | | 5/1991 | Sugiyama et al. |
| 5,219,178 A | | 6/1993 | Kobari et al. |
| 5,221,107 A | | 6/1993 | O'Loughlin |
| 5,269,561 A | | 12/1993 | Davis et al. |
| 5,320,382 A | | 6/1994 | Goldstein et al. |
| 5,340,339 A | | 8/1994 | Desai et al. |
| 5,387,007 A | | 2/1995 | Ogawa et al. |
| 5,433,475 A | | 7/1995 | Kokeguchi |
| 5,439,250 A | | 8/1995 | Kokeguchi et al. |
| 5,464,249 A | | 11/1995 | Lauritzen et al. |
| 5,468,017 A | | 11/1995 | Kirsch et al. |
| 5,513,879 A | | 5/1996 | Patel et al. |
| 5,564,743 A | | 10/1996 | Marchant |
| 5,582,428 A | | 12/1996 | Buchanan et al. |
| 5,603,525 A | * | 2/1997 | Zakula ............... 280/737 |
| 5,613,705 A | | 3/1997 | Hock et al. |
| 5,630,619 A | * | 5/1997 | Buchanan et al. .......... 280/741 |
| 5,643,345 A | | 7/1997 | Cox et al. |
| 5,685,558 A | | 11/1997 | Cuevas |
| 5,743,556 A | | 4/1998 | Lindsey et al. |
| 5,756,928 A | | 5/1998 | Ito et al. |
| 5,799,973 A | * | 9/1998 | Bauer et al. ............... 280/741 |
| 5,839,754 A | | 11/1998 | Schüter et al. |
| 5,847,310 A | | 12/1998 | Nagahashi et al. |
| 5,851,027 A | * | 12/1998 | DiGiacomo et al. ........ 280/736 |
| 5,951,041 A | | 9/1999 | Iwai et al. |
| 6,019,389 A | * | 2/2000 | Burgi et al. ............... 280/736 |
| 6,032,979 A | | 3/2000 | Mossi et al. |
| 6,050,599 A | | 4/2000 | Marsaud et al. |
| 6,053,531 A | * | 4/2000 | Katsuda et al. ............. 280/741 |
| 6,068,291 A | * | 5/2000 | Lebaudy et al. ............ 280/736 |
| 6,095,560 A | | 8/2000 | Perotto |
| 6,139,055 A | * | 10/2000 | Dahl et al. ................... 280/741 |
| 6,142,515 A | * | 11/2000 | Mika .......................... 280/736 |
| 6,149,193 A | * | 11/2000 | Canterberry et al. ........ 280/741 |
| 6,168,200 B1 | * | 1/2001 | Greist, III et al. .......... 280/736 |
| 6,170,869 B1 | * | 1/2001 | Tomiyama .................. 280/741 |
| 6,199,906 B1 | * | 3/2001 | Trevillyan et al. .......... 280/741 |
| 6,206,414 B1 | * | 3/2001 | Cook et al. ................. 280/734 |
| 6,412,815 B1 | * | 7/2002 | Nakashima et al. ........ 280/736 |
| 6,460,883 B1 | * | 10/2002 | Nakashima et al. ........ 280/736 |

FOREIGN PATENT DOCUMENTS

| | | |
|---|---|---|
| DE | 9117212 U | 3/1997 |
| DE | 19611102 A | 9/1997 |
| DE | 29708380 U | 9/1997 |
| DE | 19620758 A1 | 11/1997 |
| DE | 29801477 U | 6/1998 |
| DE | 19725452 A | 12/1998 |
| DE | 19816216 A | 10/1999 |
| EP | 0012627 A | 6/1980 |
| EP | 0359408 A | 3/1990 |
| EP | 0365739 A1 | 5/1990 |
| EP | 0382552 A | 8/1990 |
| EP | 0405962 A | 1/1991 |
| EP | 0544918 A1 | 6/1993 |
| EP | 0609981 A | 8/1994 |
| EP | 0665138 A2 | 8/1995 |
| EP | 0708003 A1 | 4/1996 |
| EP | 0733519 A2 | 9/1996 |
| EP | 0733520 A1 | 9/1996 |
| EP | 0773145 A2 | 5/1997 |
| EP | 0787630 A1 | 8/1997 |
| EP | 0788945 A2 | 8/1997 |
| EP | 0800964 A | 10/1997 |
| EP | 0841225 A1 | 5/1998 |
| EP | 0857627 A1 | 8/1998 |
| EP | 0870651 A1 | 10/1998 |
| EP | 0879739 A1 | 11/1998 |
| EP | 19732825 A | 2/1999 |
| EP | 0901946 A | 3/1999 |
| EP | 0943502 A | 9/1999 |
| JP | 2-74442 A | 3/1990 |
| JP | 2169347 A | 6/1990 |
| JP | 5024498 A | 2/1993 |
| JP | 5053169 U | 7/1993 |
| JP | 5082713 U | 11/1993 |
| JP | 5319199 A | 12/1993 |
| JP | 6-183310 A | 7/1994 |
| JP | 7232613 A | 9/1995 |
| JP | 8090259 A | 4/1996 |
| JP | 2532786 B2 | 6/1996 |
| JP | 8-168416 A | 6/1996 |
| JP | 3029326 U | 7/1996 |
| JP | 8198048 A | 8/1996 |
| JP | 8207696 A | 8/1996 |
| JP | 8332911 A | 12/1996 |
| JP | 3040049 U | 5/1997 |
| JP | 9183359 A | 7/1997 |
| JP | 9207705 A | 8/1997 |
| JP | 9213417 A | 8/1997 |
| JP | 1006912 A | 1/1998 |
| JP | 10129400 A | 5/1998 |
| JP | 10181516 A | 7/1998 |
| JP | 10217899 A | 8/1998 |
| JP | 10241785 A | 9/1998 |
| JP | 10297416 A | 11/1998 |
| JP | 10315901 A | 12/1998 |
| JP | 10324219 A | 12/1998 |
| JP | 11048905 A | 2/1999 |
| JP | 11059318 A | 3/1999 |
| JP | 11091494 A | 4/1999 |
| JP | 11096868 A | 4/1999 |
| JP | 11217055 A | 8/1999 |
| WO | 9734784 A1 | 9/1997 |
| WO | 98/09355 A | 3/1998 |
| WO | 9908062 A1 | 2/1999 |
| WO | 9942339 A | 8/1999 |

OTHER PUBLICATIONS

"Variable Output Pyrotechnic Air Bag Inflator," Research Disclosure, GB, Nov. 1995, No. 379, pp. 743–745.

"Dual Connector for Two–Stage Air Bag Inflator," Research Disclosure, GB, Apr. 1998, No. 408, pp. 320–321.

* cited by examiner

AIR BAG GAS GENERATOR AND AIR BAG DEVICE

This application is the national phase under 35 U.S.C. § 371 of PCT International Application No. PCT/JP99/06701 which has an International filing date of Nov. 30, 1999, which designated the United States of America.

BACKGROUND OF THE INVENTION

1. Field of the Invention

The present invention relates to a gas generator for an air bag and an air bag apparatus including two or more ignition means and two or more gas generating means for controlling discharge of gas or behavior of flow of the gas.

2. Description of Related Art

An air bag system which is mounted on various kinds of vehicles and the like including automobiles, aims to hold an occupant by means of an air bag (a bag body) rapidly inflated by a gas when the vehicle collides at a high speed to prevent the occupant from crashing into a hard portion inside the vehicle such as a steering wheel and a windscreen due to an inertia and being injured. This kind of air bag system generally comprises a gas generator actuated upon a collision of the vehicle and discharges gas, and the gas is introduced into an air bag to inflate the air bag.

It is desired that the air bag system of this type can safely restrain an occupant even when a frame of the occupant (for example, whether a sitting height of the occupant is long or short, whether the occupant is an adult or a child, and the like), a sitting attitude of the occupant (for example, an attitude of the occupant holding the steering wheel), and the like are different. Then, there has been conventionally suggested an air bag system which actuates while applying an impact as small as possible to the occupant at the initial stage of the actuation. Gas generators directed to such a system are disclosed in JP-A 8-207696, U.S. Pat. No. 4,998,751, and 4,950,458.

JP-A 8-207696 suggests a gas generator in which one igniter ignites two kinds of gas generating agent capsules to generate the gas in two stages. U.S. Pat. No. 4,998,751 and 4,950,458 suggest a gas generator in which two combustion chambers are provided for controlling actuation of the gas generator to generate gas in two stages due to an expanded flame of the gas generating agent.

However, these gas generators have drawbacks in that an internal structure thereof is complicated, a size of a container large, and a cost therefor is expensive.

Further, since the ratio between a surface area of gas generating agent, which burns at each of stages, and an area of a nozzle for controlling the combustion is not preferable over the entire stages, the internal pressure in the housing may be excessively low in the combustion of the first stage and excessively high in the combustion of the second stage, and therefore, it is not possible to control inflation of the air bag appropriately.

Further, in JP-A 9-183359 and DE-B 19620758, there is disclosed a gas generator in which two combustion chambers storing a gas generating agent are provided in a housing and an igniter is arranged in each combustion chamber, to adjust an activation timing of each of the igniters, thereby adjusting an output of the gas generator. However, in any of the gas generators, since the igniters arranged in the respective combustion chambers are independently arranged, it is difficult to assemble (manufacture), the structure itself of the gas generator becomes complicated and a volume thereof becomes large.

BRIEF SUMMARY OF THE INVENTION

Accordingly, the present invention provides a gas generator which actuates while applying as small an impact as possible to an occupant at the initial stage of an actuation, and can widely and optionally adjust an output and timing of an output increase of the gas generator to safely restrain an occupant even when a frame of the occupant (for example, whether a sitting height of the occupant is long or short, whether the occupant is an adult or a child, and the like), a sitting attitude of the occupant (for example, an attitude of the occupant holding the steering wheel) and the like are different, and also can stabilize a combustion performance as well as restricting the total size of a container, having a simple structure, and being easily manufactured and lightweight.

A gas generator for an air bag of the present invention includes two or more ignition units in a housing in combination of a gas discharge port or gas discharge ports formed in the housing, and a sealing unit such as a seal tape for closing the gas discharge port. When a plurality of combustion chambers are provided in the housing, respective gas generating agents accommodated in each combustion chamber are independently ignited and burnt simultaneously or at intervals by a different ignition unit. And by controlling a diameter of the opening (opening area) of the gas discharge port and/or a thickness of the seal tape which closes the gas discharge port, it is possible to equalize the pressure (hereinafter, referred as "combustion internal pressure") in the housing when the gas generating means burns, and also to stabilize the combustion performance.

Namely, the present invention provides the gas generator for an air bag which comprises a housing forming an outer shell container and accommodating two or more ignition units to ignite upon an impact, and two or more gas generating agents which are respectively ignited and burnt by the ignition units to generate a combustion gas for inflating an air bag, and a plurality of gas discharge ports formed in the housing and closed by sealing means for maintaining an internal pressure of the housing to a given pressure, wherein a breaking pressure for breaking the sealing unit is adjusted at multiple stages by two or more gas discharge ports and/or two or more sealing units.

Preferably, a difference in the maximum internal pressures in the housing at the time of activation of the respective ignition unit is suppressed.

The breaking pressure can be adjusted by either one of an opening diameter, an opening area of the gas discharge port and the sealing units, or by a combination thereof. That is, the opening diameter can be changed between 1 and 8 mm, or 1.2 and 4 mm. With respect to the gas discharge ports being next to each other in breaking pressure for breaking the sealing units, a ratio of different breaking pressures thereof is 1.1/1 or greater, and more preferably, 4/1 to 1.1/1.

The opening area and the ratio of the opening area are changed in accordance with the amount of the gas generating agent or a surface area of the agent. The thickness of the sealing unit is changed in accordance with the ratio of the opening area or the amount of the gas generating agent or the surface area of the agent.

The amount and shape of the gas generating agent can be individually and optionally set for each of the plurality of combustion chambers. The amount of generated gas is largely varied by the number of ignitions and ignition timing. Therefore, in comparison with the generator having a single ignition unit, there exist a plurality of gas generating behavior, i.e., output characteristics, and any one of them can be selected. The combustion internal pressure depends on the ratio between the surface area of the gas generating agent and the opening area of the gas-discharge ports. When there are more than one kind of gas generating agents, the surface area of the gas generating agent, i.e., the combustion surface area is changed by the number of the ignitions and the igniting timing.

The breaking pressure is adjusted by arranging two or more kinds of opening diameters and/or opening areas of the gas discharge port. It is preferable that among two kinds or more of the gas discharge ports formed in the housing, with respect to two kinds of openings being next to each other in size of the opening diameter thereof, a ratio between the larger diameter gas discharge port and the smaller diameter gas discharge port is 4/1 to 1.1/1 and/or a ratio in opening area is 97/3 to 3/97.

Further, the breaking pressure is adjusted by arranging two or more kinds of thicknesses of the sealing unit. It is preferable that among sealing units having two kinds or more of thicknesses, with respect to the sealing units being next to each other in thickness, a thickness ratio between them is 1.1/1 to 12/1. The breaking pressure is adjusted by setting an area ratio of the two kinds or more of discharge ports having different areas that are sealed by the sealing means having two or more different thicknesses is 97/3 to 3/97. Further, in the present invention, the breaking pressure can be adjusted by arranging two or more kinds of opening diameters and/or opening areas of the gas discharge ports, and by arranging two or more kinds of thicknesses of the sealing units. Also in this case, a ratio of area of the two kinds or more of discharge ports sealed by the sealing units having two or more different thicknesses can be in a range of 97/3 to 3/97.

Further, it is preferable that the sealing unit is a seal tape comprising a seal layer having a thickness of 20 to 200 $\mu$m and a bonding layer or an adhesive layer having a thickness of 5 to 100 $\mu$m. In the present invention, the thickness of the seal tape includes the thickness of the seal layer and the thickness of the bonding layer or the adhesive layer. In the sealing unit such as the seal tape, the breaking pressure is adjusted by the size of the gas discharge port and/or the thickness thereof, but the maximum internal pressure in the housing at the time of combustion of the gas generating agent (hereinafter, refer to as "a combustion maximum internal pressure") and the combustion performance of the gas generating agent are not adjusted.

That is, in the gas generator of the present invention, a maximum combustion internal pressure at the time of combustion of the gas generating agent is adjusted by the opening area of the gas discharge port. As a result, even after the seal tape is broken, the internal pressure in the housing can be adjusted by the relation between the opening area and the combustion performance of the gas generating agent. It is preferable that the sealing unit (especially when the sealing unit is a seal tape) includes a moisture-proof function for preventing moisture from entering the housing. In the present invention, when a constituent element which requires the moisture-proof function such as the gas generating agent is additionally provided with the moisture-proof unit, the sealing unit can be satisfactory only if the breaking pressure thereof is adjusted in multiple stages. As such an additional moisture-proof unit, in the case of the gas generating agent for example, an unit such as one enveloping with a moisture-proof sheet can be used.

In the gas generator of the present invention, a plurality of combustion chambers are provided in the housing, each of the gas generating agents for generating the combustion gas is accommodated in individual combustion chamber and independently ignited by the respective ignition unit. With this structure, a flame generated by combustion of a gas generating agent cannot be transferred to the other gas generating agent. It is preferable that the gas generating agents accommodated in the respective combustion chambers are solid gas generating agents having a different surface area per unit weight from each other. For example, when two combustion chambers accommodating the gas generating agents are provided in the housing, the combustion chambers can be concentrically provided so as to be adjacent in the radial direction of the housing, or the housing can be formed into a cylindrical shape having an axial core length longer than an outermost diameter, and the combustion chambers can be concentrically provided so as to be adjacent in the axial direction and/or a radial direction of the housing. In this case, a communication hole which allows communication between the combustion chambers can be provided. In the respective combustion chambers provided in the above way, the gas generating agents are accommodated and burnt independently. These combustion chambers are chambers exclusively used for accommodating the gas generating agents, and even if the ignition unit includes the transfer charge, the chambers can be distinguished from the space in which the transfer charge is accommodated.

The structural requirements of a dual pyrotechnic inflator according to the present invention having a plurality of openings and the equalized combustion internal pressure (the stabilized combustion performance) are that two or more ignition units and a housing for accommodating the gas generating agent are provided, the housing is provided with two or more kinds of nozzles having different opening diameter/opening area, and/or the thickness of the sealing unit which closes the gas discharge port is controlled in two ways or more. For example, the present invention is characterized in that a large nozzle and a small nozzle are formed, the large nozzle is broken at the initial stage of activation of the dual pyrotechnic inflator, i.e., by the ignition of the gas generating agent in the first chamber, and the small nozzle is opened later than, or simultaneously with the large nozzle, i.e., when the gas generating agent in the second chamber is ignited or the two igniters simultaneously ignite and the gas generating agents in both the chambers are burnt.

It is another object of the present invention to have a different charged amount of propellant (between the first chamber and the second chamber). For example, the large nozzle is opened at the internal pressure of 100 kg/cm$^2$, and when the internal pressure reaches 150 kg/cm$^2$ or greater, the small nozzle is also opened. In order to achieve this, it is possible to change the diameter of the nozzle of the gas discharge port while keeping the thickness of the seal tape constant, or to change the thickness of the seal tape while keeping the diameter of the nozzle constant. By controlling the diameter of the gas discharge port and/or the breaking pressure of the sealing means in the above way, for example, in a case that the two combustion chambers are provided in the housing and that the first gas generating agent and the second gas generating agent are separated and accommodated in the respective combustion chambers, combustion of any gas generating agent can be performed constantly under the ideal combustion conditions (e.g., combustion internal pressure and the like). In other words, if all of the gas discharge ports are opened at the initial stage, appropriate combustion environment can be obtained in the case of burning simultaneously the first and second gas generating agents. However, in the case of burning the second gas generating agent after about 30 milliseconds, the combustion gas of the first gas generating agent has been discharged during that period, whereby the combustion internal pressure at the time of burning the second gas generating agent becomes slightly lower as compared with the case when the two gas generating agents are burnt simultaneously, and it is not optimal combustion environment for burning the second gas generating agent. If the opening area of the gas discharge port is adjusted to be small to compensate this defect, in the case that the second gas generating agent is burnt after 10 milliseconds or 20 milliseconds, or in the case that the gas generating agents are burnt simultaneously, the pressure at combustion becomes higher. Accordingly, if one kind of gas discharge ports is opened at one time from the initial stage, it is difficult to meet all of the combustion modes. And as a result, the combustion internal pressure when the first gas generating agent is burnt is low, which brings a great difference with the internal pressure when the second gas generating agent is burnt. Thereupon, in such a gas generator, if a plurality of gas discharge ports, for example, comprising a gas discharge port opened when the first gas generating agent is burnt and a gas discharge port opened when the second gas generating agent is burnt are adjusted to be opened at different timings in accordance with the combustion of each of the gas generating agents, the gas generating agents can be burnt constantly under the ideal combustion condition (the combustion internal pressure).

Further, in the case of characteristically adjusting the actuation performance of the gas generator, particularly a change with the passage of time in the gas discharge amount, two combustion chambers are charged with the gas generating agents which are different in at least one of a burning rate, a composition, a composition ratio, and an amount from each other, respectively, and the respective gas generating agents can be independently ignited and burnt at an optional timing. Further, at each combustion chamber, the gas generating agents having a different gas amount generated at a unit time may be stored.

As the gas generating agents, in addition to an azide gas generating agent based on an inorganic azide which has been widely used, for example, a sodium azide, a non-azide gas generating agent, not based on an inorganic azide, may be used. However, from the view of safety, the non-azide gas generating agent is preferable, and as the non-azide gas generating composition, for example, a composition containing a nitrogen containing organic compound such as a tetrazole, a triazole or a metallic salt thereof and an oxygen containing oxidant such as an alkali metal nitrate, a composition using a triaminoguanidine nitrate, a carbohydroazide, a nitroguanidine and the like as a fuel and nitrogen source and using a nitrate, a chlorate, a perchlorate or the like of an alkali metal or an alkaline earth metal as an oxidant, and the like may be employed. In addition, the gas generating agent can be suitably selected according to requirements such as a burning rate, a non-toxicity, a combustion temperature, and a decomposition starting temperature. In the case of using the gas generating agents having different burning rates in the respective combustion chambers, may be used the gas generating agents having the different composition or composition ratio itself, such that, for example, the inorganic azide such as the sodium azide or the non-azide such as the nitroguanidine is used as the fuel and the nitrogen source. Alternatively, the gas generating agents obtained by changing a shape of the composition to a pellet shape, a wafer shape, a hollow cylindrical shape, a disc shape, a single hole body shape or a porous body shape, or the gas generating agents obtained by changing a surface area according to a size of a formed body may be used. In particular, when the gas generating agent is formed into the porous body with a plurality of through holes, an arrangement of the holes is not particularly limited, however, in order to stabilize a performance of the gas generator, an arrangement structure such that a distance between an outer end portion of the formed body and a center of the hole and a distance between each center of the holes are substantially equal to each other is preferable. Concretely, in the cylindrical body having a circular cross section, for example, a preferred structure is such that one hole is arranged at the center and six holes are formed around the hole so that the center of each hole is the apex of regular triangles of the equal distances between the holes. Further, in the same manner, an arrangement such that eighteen holes are formed around one hole at the center may be also suggested. However, the number of the holes and the arrangement structure are determined in connection with an easiness for manufacturing the gas generating agent, a manufacture cost and a performance, and are not particularly limited.

Additionally, the housing may contain a coolant for cooling the combustion gas generated due to combustion of the gas generating agents on the side of a peripheral wall of the housing thereof. The coolant is provided in the housing for the purpose of cooling and/or purifying- the combustion gas generated due to the combustion of the gas generating agents. For example, in addition to a filter for purifying the combustion gas and/or a coolant for cooling the generated combustion gas which have been conventionally used, a layered wire mesh filter obtained by forming a wire mesh made of a suitable material into an annular layered body and compress-molding, and the like can be used. The layered wire mesh coolant can be preferably obtained by forming a plain stitch stainless steel wire mesh in a cylindrical body, folding one end portion of the cylindrical body repeatedly and outwardly to form an annular layered body and then compress-molding the layered body in a die, or by forming a plain stitch stainless steel wire mesh in a cylindrical body, pressing the cylindrical body in the radial direction to form a plate body, rolling the plate body in a cylindrical shape at many times to form the layered body and then compress-molding it in the die. Further, the coolant with a double structure with different layered wire mesh bodies at an inner side and an outer side thereof, which has a function for protecting the coolant means in the inner side and a function for suppressing expansion of the coolant in the outer side, may be used. In this case, it is possible to restrict the expansion by supporting an outer periphery of the coolant with an outer layer such as a layered wire mesh body, porous cylindrical body, and annular belt body.

And in the case of the gas generator in which the combustion gas generated due to the combustion of the gas generating agents stored in two combustion chamber reaches the gas discharge port via a different flow paths in each combustion chamber so that the gas generating agent stored in one combustion chamber is not directly ignited due to the combustion gas generated in the other combustion chambers, the gas generating agents in the combustion chambers burn in each chamber in a completely independent manner, and therefore, the gas generating agent in each combustion chamber is ignited and burnt in more secure manner. As a result, even when activation timings of two igniters are staggered significantly, the flame of the gas generating agent in the first combustion chamber ignited by the firstly actuated igniter does not burn the gas generating agent in the other combustion chamber, so that a stable output can be obtained. This kind of gas generator can be achieved, for example, by arranging a flow passage forming member in the housing to form the flow passage and introducing the combustion gas generated in the first combustion chamber to the coolant directly.

The housing mentioned above can be obtained by forming a diffuser shell having a gas discharge port or gas discharge ports and a closure shell, which forms a storing space together with the diffuser shell, with a casting, a forging, a press-molding or the like, and joining both shells. The joining of both shells can be performed by various kinds of welding methods, for example, an electronic beam welding, a laser welding, a TIG arc welding, a projection welding, and the like. Forming the diffuser shell and the closure shell by press-molding various kinds of steel plates such as the stainless steel plate makes manufacture easy and reduces a manufacturing cost. Further, forming both shells into a simple shape as cylindrical shape makes the press-molding of the shells easy. With respect to the material of the diffuser shell and the closure shell, stainless steel is preferable, and material obtained by applying a nickel plating to the steel plate is also acceptable.

In the housing mentioned above, the ignition unit actuated upon detection of an impact and ignite and burn the gas generating agent is further installed. In the gas generator according to present invention, as the ignition unit, an electric ignition type ignition unit activated by an electric signal (or an activating signal) transmitted from an impact sensor or the like which detects the impact is used. The electric ignition type ignition unit comprises an igniter activated by the electric signal transmitted from the electric sensor which exclusively detects an impact by means of an electric mechanism such as a semiconductor type acceleration sensor or the like, and a transfer charge ignited and burnt by the activation of the igniter as required.

This transfer charge should be distinguished from the gas generating agent in that the transfer charge is for burning the gas generating agent by the combustion gas thereof and not for directly inflating the air bag. When each of the two or more ignition units includes an igniter, in order to facilitate the mounting operation of the igniters, it is preferable that the respective igniters constituting the ignition unit are provided in one initiator collar to be aligned to each other in the axial direction. When the ignition unit also comprises a transfer charge ignited and burnt upon activation of the igniter, it is preferable that the transfer charge is partitioned for each igniter and independently ignited and burnt at each igniter so that flame caused by combustion of the transfer charge corresponding to any one of the igniters does not directly ignite the transfer charge corresponding to another igniter. As such a structure, for example, it is possible that each igniter is disposed in an independent igniter accommodating chamber, and the transfer charge is disposed in the igniter accommodating chamber, or the transfer charge is disposed in a position inside the independent combustion chamber where the transfer charge can be ignited and burnt. When the transfer charge is partitioned for each igniter, the respective gas generating agent accommodated in the two or more combustion chambers can be ignited and burnt by flame caused by combustion of the transfer charge in different section. And in accordance with combustion of the gas generating agent accommodated in each of the combustion chambers, any one of the plurality of gas discharge ports is opened, and thereby the gas generating agent in each of the combustion chambers can be burnt under the ideal combustion internal pressure.

The two or more ignition units disposed in the housing respectively includes the igniter activated by an electric signal, the igniters are provided in a single initiator collar so as to be aligned to each other in the axial direction, and each igniter can be arranged eccentrically with respect to the center axis of the housing. It is preferable that lead wires for transmitting the electric signals are respectively connected to the igniters, and the lead wires extend in the same direction on the same plane. Further, the lead wires are preferably connected via connectors, and the connectors are preferably arranged in the same direction on the same plane. It is preferable that the lead wires are taken out by the connector in the same direction as well as the direction perpendicular to the axial direction of the housing, and that the connector includes a positioning member having a different shape for each igniter to be connected or with projection and recess so as to be capable of connecting only one igniter.

The present invention provides a gas generator for an air bag, comprising a housing forming an outer shell container and accommodating two or more ignition units to ignite upon an impact and two or more gas generating agents which are to be independently ignited and burnt by the ignition units to generate a combustion gas for inflating an air bag, and a plurality of gas discharge ports formed in the housing and closed by a sealing unit for maintaining an internal pressure of the housing to the given pressure, wherein a first combustion chamber which starts burning first and a second combustion chamber which starts burning later are partitioned with a wall having a communication hole, the communication hole is provided with a flame-transfer-preventing unit so that the combustion is not caused in the second combustion chamber by the combustion in the first combustion chamber.

The flame-transfer-preventing unit may be a sealing member such as a seal tape or a sealing plate. The sealing member may also seal the communication hole on the side of the first combustion chamber.

Further, the present invention provides a gas generator for an air bag, comprising a housing forming an outer shell container and accommodating two or more ignition units to ignite upon an impact and two or more gas generating agents which are independently ignited and burnt by the ignition units to generate a combustion gas for inflating an air bag, and a plurality of gas discharge ports formed in the housing and closed by a sealing unit for maintaining an internal pressure of the housing to the given pressure, wherein a first combustion chamber which starts burning first is partitioned with a wall from a second combustion chamber which starts burning later, and the gases generated in the respective combustion chambers pass through the different passages and reach the gas discharge ports.

The different passages may be formed by passage-forming members.

The gas generator for the air bag mentioned above is accommodated in a module case together with the air bag (the bag body) to introduce the gas generated in the gas generator and inflate, so as to form the air bag apparatus. In this air bag apparatus, the gas generator is actuated when reacting upon the impact detected by the impact sensor, and the combustion gas is discharged from the gas discharge port in the housing. The combustion gas is flowed into the air bag, by whereby the air bag breaks the module cover to inflate, and forms a cushion for absorbing the impact between the hard member in the vehicle and the occupant.

The present invention can be realized by combining two or more structural requirements and functions described above.

The present invention provides a gas generator which has a stabilized actuation performance at all stages of actuation thereof, and actuates while applying as small an impact as possible to an occupant at the initial stage of actuation and can widely and optionally adjust an output and timing of an output increase of the gas generator to safely restrain the occupant even when frame of the occupant (for example, whether a sitting height of the occupant is long or short, whether the occupant is an adult or a child, and the like), a sitting attitude (for example, an attitude of the occupant holding the steering wheel) and the like are different.

PREFERRED EMBODIMENTS OF THE INVENTION

A gas generator for an air bag according to the present invention will be described below on the basis of embodiments illustrated in the accompanying drawings.

Embodiment 1

Figure 1:
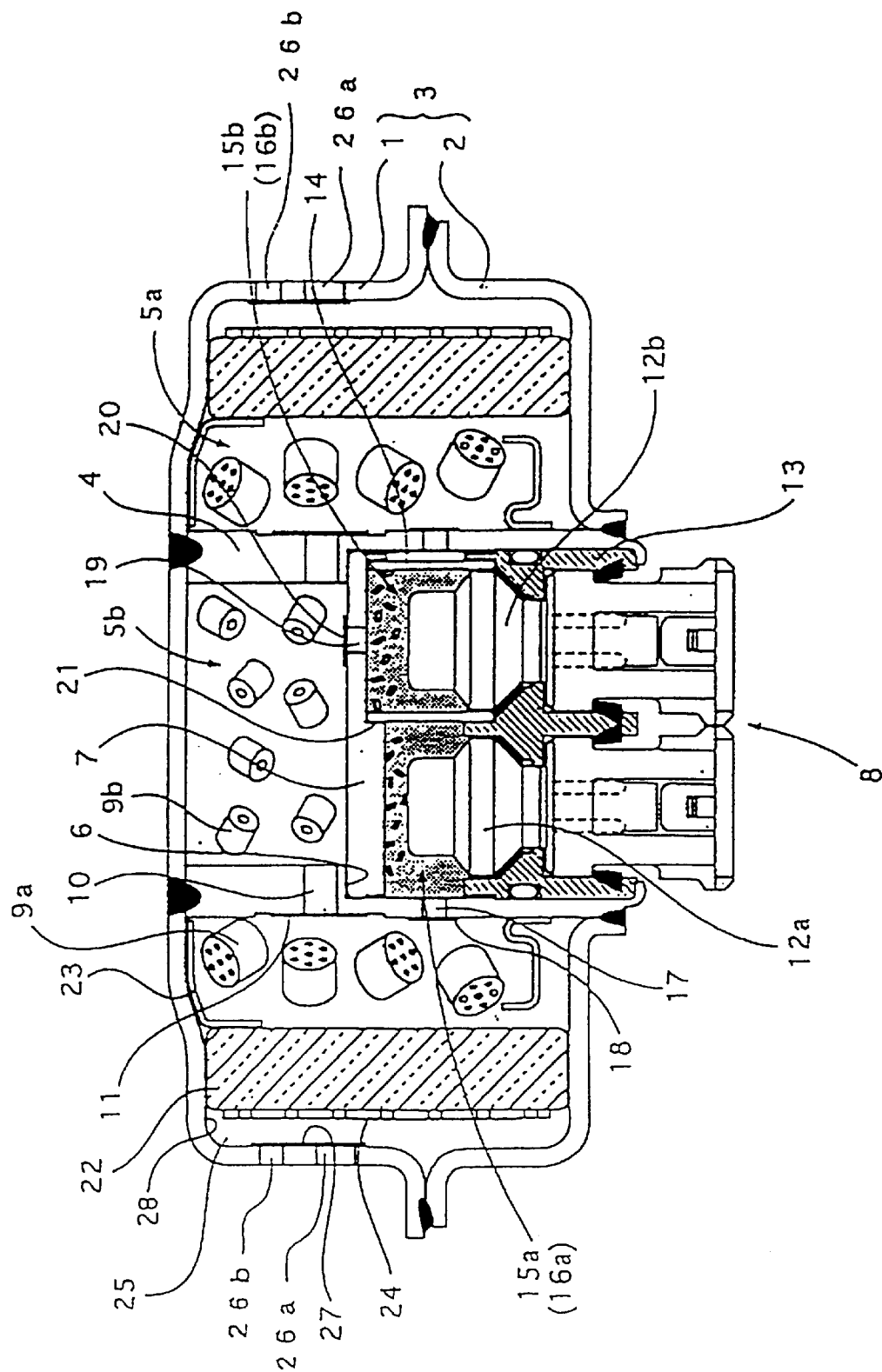
FIG. 1 is a vertical cross sectional view showing one embodiment of a gas generator of the present invention.

FIG. 1 is a vertical cross sectional view of a first embodiment of a gas generator for an air bag according to the present invention, which shows a structure particularly suitable for being arranged in a driver side.

The gas generator comprises a housing 3 which is formed by joining a diffuser shell 1 with gas discharge ports and a closure shell 2 forming a inner accommodating space with the diffuser shell, and an inner cylindrical member 4 formed in a substantially cylindrical shape arranged in the housing 3, thereby forming a first combustion chamber 5a by an outer side of the inner cylindrical member 4. Further, a stepped notch portion 6 is provided inside the inner cylindrical member, a partition wall 7 formed in a substantially flat circular shape is arranged in the stepped notch portion, the partition wall further partitions an inner portion of the inner cylinder into two chambers to form a second combustion chamber 5b in the diffuser shell side (in the upper space side) and an ignition means accommodating chamber 8 in the closure shell side (in the lower space side), respectively. As a result, in this gas generator, the first combustion chamber 5a and the second combustion chamber 5b are concentrically provided in the housing 3 and arranged adjacent to each other in the radial direction of the housing. Gas generating agents (9a, 9b) which are burnt by ignition means activated upon an impact to generate combustion gas are stored in the first and second combustion chambers, and the ignition means actuated upon an impact is stored in the ignition means accommodating chamber 8. A through hole 10 is provided in the inner cylindrical member 4 which defines the first combustion chamber 5a and the second combustion chamber 5b, and the through hole is closed by a seal tape 11. The seal tape 11 is ruptured when the gas generating agent 9b is burnt, and both combustion chambers are communicated with each other by the through hole 10. The material or thickness of the seal tape 11 should be selected such that the seal tape is broken exclusively when the gas generating agent 9b in the second combustion chamber 5b is burnt. In the present embodiment, a stainless seal tape having a thickness of 40 µm is used. Further, the through hole 10 does not function to control an internal pressure in the combustion chamber 5b since an opening area thereof is formed larger than a gas discharge port 26b.

The ignition means comprises two electric ignition type igniters (12a, 12b) activated by an activating signal outputted upon detection of a collision by the sensor, and the igniters are provided in parallel to each other in a single initiator collar 13 so as to expose head portions thereof. As mentioned above, two igniters are fixed to the initiator collar 13 to form a single member by providing two igniters 12a and 12b in one initiator collar 13, thereby facilitating an assembly to the gas generator. In particular, in the gas generator illustrated in this drawing, since the initiator collar 13 is formed in a size capable of being inserted into the inner cylindrical member 4, the igniters are easily and securely fixed by crimping the lower end of the inner cylindrical member 4 to fix the initiator collar after inserting the initiator collar 13 provided with two igniters 12a and 12b into the inner cylinder 4. Further, when arranging the two igniters (12a, 12b) in the initiator collar 13, a direction of each igniter can be easily adjusted.

In this embodiment, a substantially cylindrical separating cylinder 14 is arranged in a space between the initiator collar 13 and the partition wall 7 to surround the igniter 12b (hereinafter, referred to as "a second igniter"), a first transfer charge accommodating chamber 15a defined in the outer side of thereof and a second transfer charge accommodating chamber 15b are defined in the inner side thereof, respectively, and the igniter and the transfer charge constituting the ignition means together with the igniters are stored in each accommodating chambers. As a result, transfer charges (16a, 16b) constituting the ignition means together with the igniters are securely partitioned into the respective igniters (12a, 12b). When the transfer charge 16a in the first transfer charge accommodating chamber 15a is burnt, the seal tape 18 closing the flame-transferring hole 17 provided in the cylindrical member 4 is ruptured, whereby the first transfer charge accommodating chamber 15a communicates with the first combustion chamber 5a. And when the transfer charge 16b in the second transfer charge accommodating chamber 15b is burnt, the seal tape 20 closing the flame-transferring hole 19 provided on the partition wall 7 is ruptured, whereby the second transfer charge accommodating chamber 15b communicates with the second combustion chamber 5b. Accordingly, in this gas generator, at activation, a flame generated, when the first igniter 12a is ignited (activated), ignites and burns the transfer charge 16a in the accommodating chamber 15a and then, the flame thereof passes through the flame-transferring hole 17 formed in the inner cylindrical member 4 and ignites and burns a gas generating agent 9a having seven holes stored in the first combustion chamber 5a positioned in the radial direction of the chamber 15a. When the second igniter 12b ignites and burns the second transfer charge 16b stored in the accommodating chamber 15b and the flame thereof passes through the flame-transferring hole 19 provided in the axial direction of the accommodating chamber 15b and ignites and burns a gas generating agent 9b having a single hole stored in the second combustion chamber 5b disposed on an extension thereof. The combustion gas generated in the second combustion chamber 9b passes through the through hole 10 provided in the diffuser shell side 1 of the inner cylindrical member 4 and flows into the first combustion chamber 5a. Particularly, in the gas generator shown in FIG. 1, the separating cylinder 14 arranged between the initiator collar and the partition wall 7 is arranged such that a hole portion 21 corresponding to an outer shape of the separating cylinder 14 are provided on the lower surface of the partition wall 7 and the upper surface of the initiator collar 13, and the upper end and the lower end of the separating cylinder 14 are fitted into the respective hole portions. By arranging the separating cylinder 14 in this manner, a flame of the transfer charge generated in one of the transfer charge combustion chambers does not directly burn the transfer charge in the other transfer charge accommodating chamber, and the gas generating agents stored in two combustion chambers are respectively ignited and burnt by the flame generated by the combustion of the transfer charges in the different sections. Namely, in general, when the transfer charge burns in the separating cylinder 14 (that is, in the second transfer charge accommodating chamber), a pressure of the gas generated by the combustion serves to expand the separating cylinder 14 in the radial direction. However, by arranging the separating cylinder, such that the upper and lower end portions of the separating cylinder are securely supported by peripheral walls of the hole portions where the respective portions are fitted, in comparison with the case of simply interposing the separating cylinder between the partition wall and the initiator collar, leaking of the combustion gas and the flame of the transfer charge can be prevented securely.

Further, a coolant/filter 22 for purifying and cooling the combustion gas generated by the combustion of the gas generating agents (9a, 9b) is disposed in the housing 3. An inner peripheral surface in the diffuser shell 1 side of the coolant/filter 22 is covered with a short pass preventing member 23 so that the combustion gas does not pass between an end surface of the coolant/filter 22 and a ceiling portion inner surface 28 of the diffuser shell 1. An outer layer 24 for preventing the coolant/filter 22 from expanding outwardly due to passing of the combustion gas or the like is arranged on the outer side of the coolant/filter 22. The outer layer 24 is, for example, formed by using a layered wire mesh body, or alternatively, may be formed by using a porous cylindrical member having a plurality of through holes on a peripheral wall surface or a belt-like suppressing layer obtained by forming a belt-like member with a predetermined width into an annular shape. A gap 25 is further formed on the outer side of the outer layer 24 so that the combustion gas passes through the entire surface of the coolant/filter 22.

The gas generator of the present invention is characterized in a structure of the gas discharge port formed in the diffuser shell 1 and/or the seal tape for closing the gas discharge port. A peripheral wall portion of the diffuser shell 1 of the gas generator shown in FIG. 1 is provided with two kinds of gas discharge ports 26a and 26b having different diameters, and the number of the respective ports can be set equal. In this case, since the diameter of the gas discharge port 26a is larger than that of the gas discharge port 26b and the number of the respective ports are the same, the total opening area of the gas discharge port 26a is greater than that of the gas discharge port 26b. In the present embodiment, the diameter of the gas discharge port 26a is $\phi$3.0 mm, the number of holes thereof is 10, the diameter of the gas discharge port 26b is $\phi$2 mm, and the number of holes thereof is 10. Seal tapes 27 are attached to the gas discharge ports 26a and 26b on the inner peripheral surface of the peripheral wall of the diffuser shell 1 in order to protect the gas generating agent against influence of external environment such as moisture outside the housing. Preferably, the seal tape 27 has a width large enough for closing the two kinds of gas discharge ports 26a, 26b together which are arranged in the axial direction of the gas generator, and the tape 27 has an excessive margin of 2 to 3 mm from the upper or lower end of the gas discharge ports 26a and 26b to the upper or lower end of the seal tape. The seal tape comprises an aluminum seal layer having thickness of 20 $\mu$m to 200 $\mu$m and a bonding layer or adhesive layer having thickness of 5 to 100 $\mu$m. However, as long as the tape exhibits the desired effect, the material or structure of the seal tape is not limited. The present embodiment uses a seal tape comprising an aluminum seal layer having thickness of 50 $\mu$m and a bonding layer or adhesive layer having thickness of 50 $\mu$m. The gas discharge ports 26a and 26b are arranged in the axial direction of the housing of the gas generator in the present embodiment, but the gas discharge ports may be arranged alternately and circumferentially in the peripheral wall of the diffuser shell in order to obtain the effect of the present invention. By means of the combination of the gas discharge ports and the seal tape described above, the pressure for breaking the seal tape is adjusted in two stages.

An opening having 3 mm diameter has an area of 0.71 cm$^2$, an opening having 2 mm diameter has an area of 0.31 cm$^2$, and when there are 10 holes, the total opening area is 10.2 cm$^2$. With respect to the openings being next to each other in opening diameter, a ratio of the opening diameters is 1.5. A ratio of the opening area is 2.29/1.

When the gas generator is activated in this structure, for example, when an igniter for igniting the single-hole gas generating agent of the combustion chamber 5b is activated after 3 msec (milliseconds) from energization of the igniter for igniting the seven hole gas generating agent in the combustion chamber 5a, the opening area (the diameter and the number of holes) of the discharge ports 26a is correlated with a surface area of combustion of the gas generating agent in the combustion chamber 5a, and further the opening area (the diameter and the number of holes) of the discharge ports 26b is correlated with a surface area of combustion of the gas generating agent in the combustion chamber 5b. Conventionally, since the discharge ports have only a single diameter, it was only possible that the opening area is correlated with the surface area of the gas generating agent in the combustion chamber 5a or with the surface of all the gas generating agent of the combustion chambers 5a and 5b.

In the former case, the condition is optimal when the gas generating agent in the combustion chamber 5a is burnt, but when the gas generating agent in the combustion chamber 5b is subsequently burnt or when the gas generating agents in both combustion chambers 5a and 5b are burnt, the combustion pressure may become high, and the gas generator may excessively output gas. Further, in the latter case, when only the gas generating agent in the combustion chamber 5a is first burnt, the output becomes too slow on the contrary, and therefore, sufficient restraining performance at the initial developing stage of the air bag can be hardly obtained.

According to the present invention, as shown in the present embodiment, two kinds of discharge ports having different opening areas are provided. The area thereof is correlated with the surface area of the gas generating agent of each of the combustion chambers, thereby an optimal development of the air bag irrespective of ignition timing of the gas generating agent can be obtained. Although the number of kinds of the opening area of the gas discharge port is two, it is also possible to suppress the difference in output performance due to environment temperature by further increasing the kinds and adjusting the breaking pressure of the seal tape at multiple stages. Such an effect of the present invention can be confirmed also by the following tank combustion test.

<Tank combustion test>

A gas generator for the air bag is placed and fixed in a SUS (stainless steel) tank having an inner volume of 60 liters, and the gas generator is connected to an outer ignition electric circuit after sealing the tank at a room temperature. With setting a time when an ignition electric circuit switch is turned on (an ignition electric current is applied) to 0, a pressure increase change inside the tank is measured by a pressure transducer independently placed in the tank for a time between 0 and 200 milliseconds. Each of the measured data is finally set to a tank pressure/time curve by a computer process, and a curve estimating a performance of a gas generating molded article (hereinafter, referred to as "a tank curve") is obtained. After finishing the combustion, the gas in the tank is partly taken out and may be applied to a gas analysis for CO, NOx, etc.

In the gas generator constituted in the above manner, when the first igniter 12a, disposed outside the separating cylinder 14, which is inside the ignition means accommodating chamber 8, and is activated, the transfer charge 16a stored in the first transfer charge accommodating chamber 15a is ignited and burnt, and the flame thereof passes through the flame-transferring hole 17 in the inner cylindrical member 4 and burns the porous cylindrical first gas generating agent 9a having seven holes stored in the first combustion chamber 5a. And when the second igniter 12b, surrounded by the separating cylinder 14, is activated, the transfer charge 16b, stored in the second transfer charge accommodating chamber 15b, is ignited and burnt, and the flame thereof ignites and burns the single-hole cylindrical second gas generating agent 9b stored in the second combustion chamber 5b. As a result, an output forms (an actuation performance) of the gas generator can be optionally adjusted by adjusting the ignition timings of two igniters 12a and 12b such as activating the second igniter after the activation of the first igniter or simultaneously activating the first igniter and the second igniter. Therefore, under various kinds of circumstances such as a speed of a vehicle and an environmental temperature at a time of collision, it is possible to inflate the air bag in the air bag apparatus mentioned below in a most suitable manner. Particularly, in the gas generator shown in this drawing, the respective combustion chambers (5a, 5b) contain the gas generating agents (9a, 9b) to provide different shapes from each other, respectively, and the porous cylindrical first gas generating agent 9a and the single-hole cylindrical second gas generating agent 9b are respectively stored in the first combustion chamber 5a and the second combustion chamber 5b. Further, the amount of the gas generating agent stored in each combustion chamber (5a, 5b) is different, and the gas generating agents (9a, 9b) at an amount of 35 g and 6 g are stored respectively in the first combustion chamber 5a and the second combustion chamber 5b. Consequently, in this gas generator, the output forms can be adjusted more precisely. Naturally, a shape, a composition, a composition ratio, and an amount, etc. of the gas generating agent may be changed to obtain the desired output forms.

According to the present invention, the internal pressure at the time of activation of the gas generator can be equalized and the combustion performance can be stabilized by the combination of the two or more igniters and two kinds or more of gas discharge ports described above.

Figure 2:
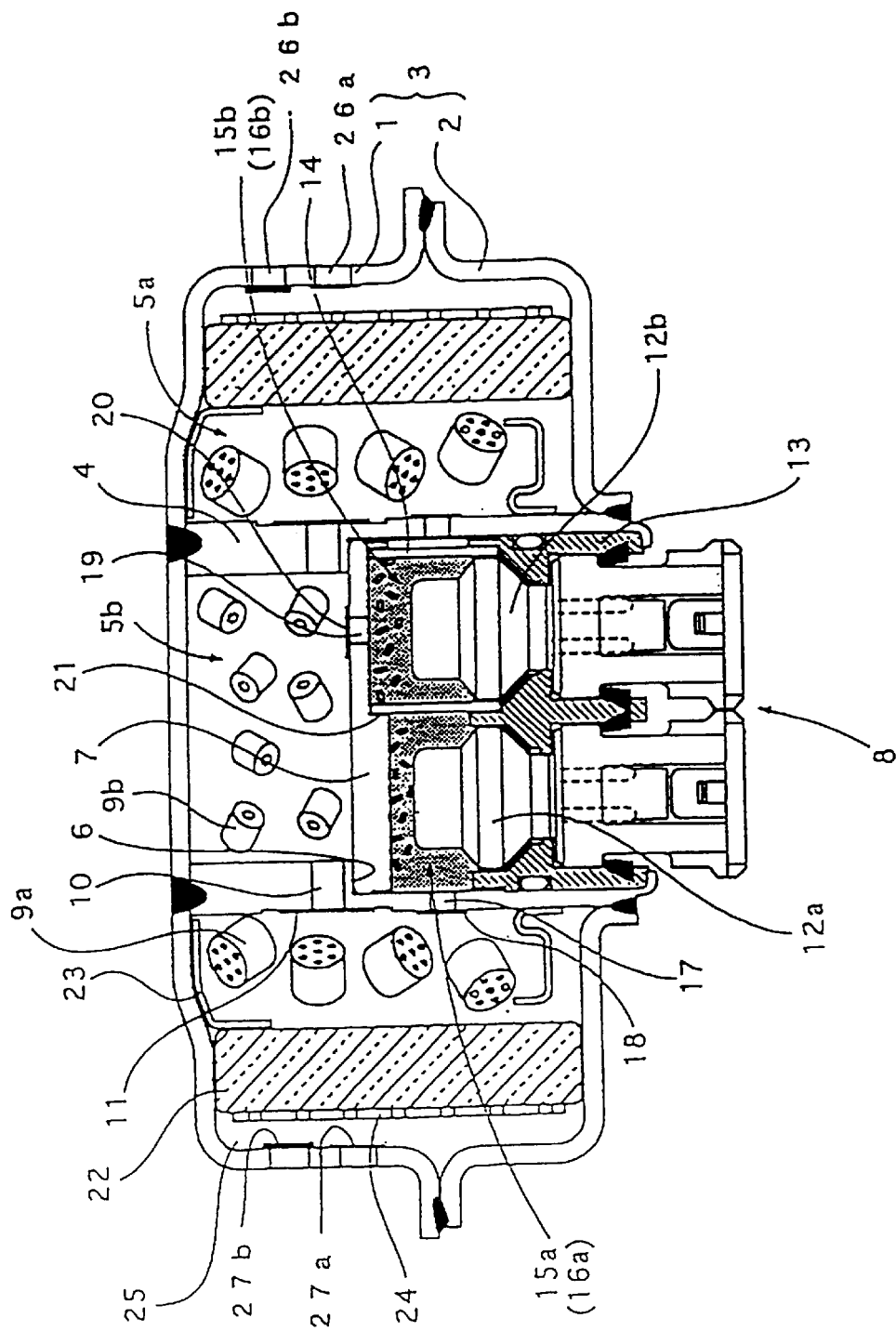
FIG. 2 is a vertical cross sectional view showing another embodiment of a gas generator of the invention.

The gas generator shown in FIG. 2 has the same structure as that shown in FIG. 1 except that structures of the gas discharge port provided in the diffuser shell of the housing and of the seal tape for closing the gas discharge port are different, the same members as those shown in FIG. 1 are designated with the same symbols, and explanation thereof is omitted.

FIG. 2 shows an embodiment in which in order to adjust the pressure for breaking the seal tape in two stages, the opening areas of the gas discharge ports (the diameters and the number of holes) are the same but the thickness of the seal tapes are changed. The gas generator includes twenty openings 26a and 26b, each having a diameter of 3 mm, which are closed with fourteen seal tapes 27a comprising aluminum layer of 80 $\mu$ and bonding layer of 50 $\mu$, and six seal tapes 27b comprising aluminum layer of 160 $\mu$ and adhesive layer of 50 $\mu$. In this gas generator, a ratio of thickness is 1.61/1, and an opening area ratio is 70/30 between the different thicknesses. In this case, the gas discharge ports 26a and the gas discharge ports 26b are arranged vertically in the axial direction of the housing, and the seal tape 27b, closing the gas discharge port 26b, is thicker than the seal tape 27a closing the gas discharge port 26a. However, the thickness of the seal tape is selected to adjust the output performance (activating performance) of the gas generator, and the internal pressure in the housing at the time of combustion of the gas generating agent is determined by the opening area of the gas discharge port. That is, the seal tape does not influence the maximum combustion internal pressure. The opening areas of the gas discharge ports 26a and 26b (the diameters and the number of holes) are the same. In this case, for example, when the gas generating agent 9a in the combustion chamber 5a is burnt, the opening area of the gas discharge port 26a and the thickness of the seal tape 27a are selected so that all seal tapes 27a covering the gas discharge ports 26a are broken. When the gas generating agent 9b in the combustion chamber 5b is subsequently burnt, or when the gas generating agents 9a and 9b in the combustion chambers 5a and 5b are simultaneously burnt, higher combustion internal pressure is generated. Therefore, at that time, the thicker seal tape 27b is attached to the gas discharge port 26b so that the seal tapes 27a and 27b covering all the gas discharge ports 26a and 26b are broken. In other words, the thickness of the seal tape 27a of the gas discharge port 26a is selected so that the seal tape 27a is broken only by the combustion of the gas generating agent 9a in the combustion chamber 5a and thus, the seal tape 27b of the gas discharge port 26b cannot be broken. For this reason, since the surface area of the gas generating agent in the combustion chamber 5a is correlated only with the opening area of the gas discharge port 26a, the optimal combustion can be obtained. Thereafter, if the gas generating agent 9b in the combustion chamber 5b is burnt at intervals, or when the gas generating agents 9a and 9b in both the combustion chambers are simultaneously burnt, further higher combustion pressure is generated. Therefore, the seal tape 27b of the gas discharge port 26b is also broken to suppress increase of the internal pressure, and the air bag can be deployed in the optimal manner irrespective of ignition timing. In this case also, as described with reference to FIG. 1, material and structure of the seal tape, and arrangement of the gas discharge port are not a limiting element for obtaining the effect of the object, and arbitrary manner can be employed. Further, by changing the thickness at multiple stages, the gas generator is less influenced by environment temperature and the like.

Although opening areas of the gas discharge ports and the thickness of the seal tape are changed into several kinds in the two embodiments shown in FIGS. 1 and 2, both of them can also be adjusted.

Embodiment 2

Figure 3:
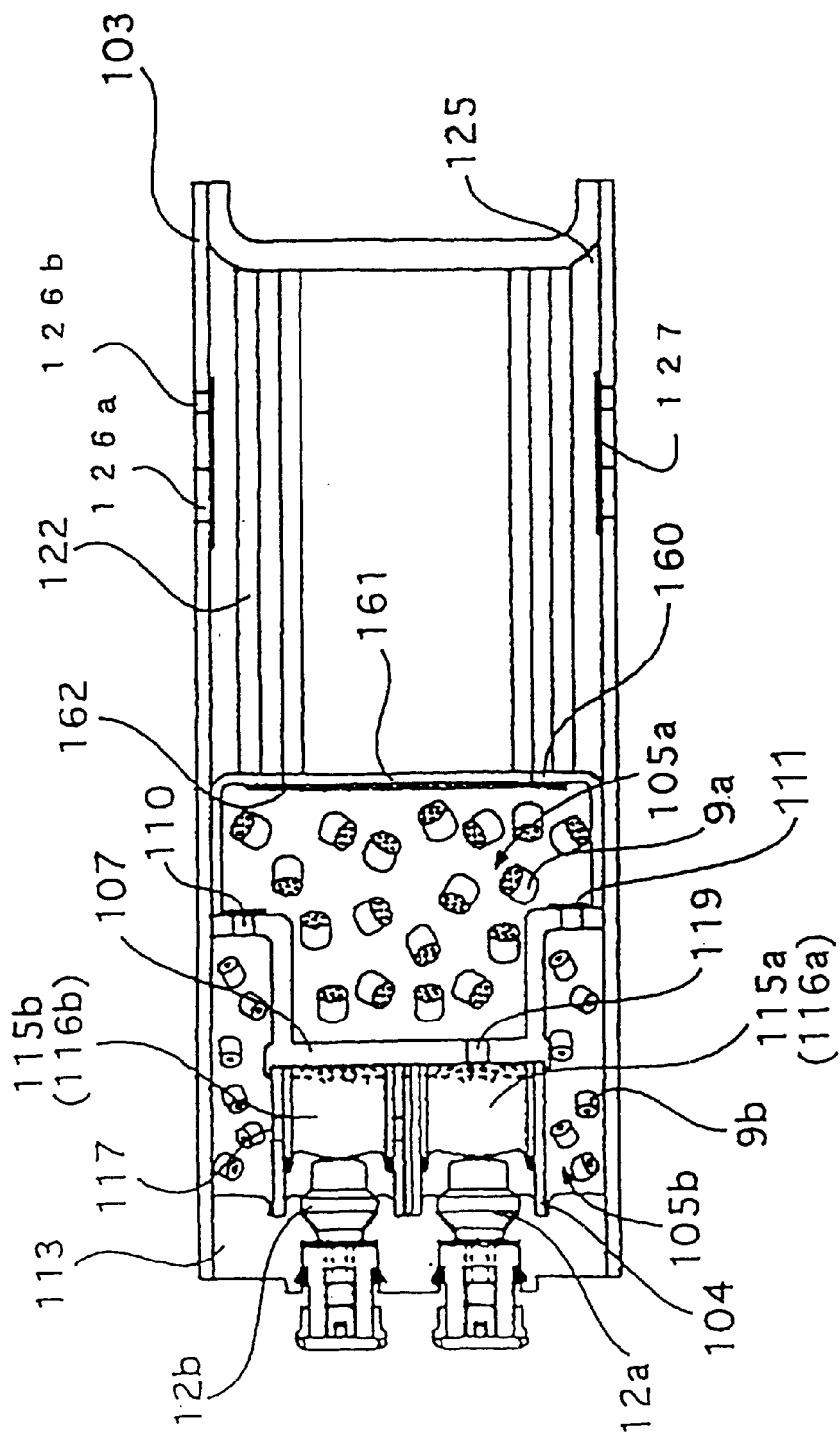
FIG. 3 is a vertical cross sectional view showing another embodiment of a gas generator for an air bag of the invention.

FIG. 3 is a vertical cross sectional view which shows another embodiment of a gas generator for an air bag according to the present invention. This gas generator is structured such as to be particularly suitable for being arranged in a passenger side of the vehicle.

The gas generator shown in this drawing has, in the housing 103 formed into a cylindrical shape having an axial core length longer than an outermost diameter and having a plurality of gas discharge ports on a peripheral wall thereof, ignition means actuated upon an impact, gas generating agents (9a, 9b) ignited and burnt by the ignition means and generate a combustion gas for inflating the air bag, and a coolant/filter 122 for cooling and/or purifying the combustion gas generated by the combustion of the gas generating agents. Two combustion chambers (105a, 105b) provided in the housing 103 are concentrically provided so as to be adjacent to each other with respect to an axial direction of the housing 103, and a communicating hole 110 which allows communication between the combustion chambers 105a and 105b is provided.

The gas generator shown in the present embodiment is formed in a long shape in the axial direction since the housing is formed in a long cylindrical shape in the axial direction. The gas generator formed in this shape can be a gas generator having a simple structure and easily manufactured while the output of the gas generator and the timing for increasing the output can be optionally adjusted by concentrically providing two combustion chambers 105a and 105b so as to be adjacent to each other and making both the combustion chambers communicate with each other.

The ignition means comprises two or more igniters activated upon an impact and the respective igniters (12a, 12b) are provided in a single initiator collar 113 so as to be parallel to each other, and thereby an assembly thereof can be easily performed. Further, the igniters (12a, 12b), fixed in the single initiator collar 113 and stored in the housing, are arranged eccentrically with respect to a longitudinal axis of the housing.

Further, a coolant/filter 122, formed in a substantially cylindrical shape, is arranged in the housing 103 so as to oppose a housing inner peripheral surface in which a plurality of gas discharge ports 126a and 126b are formed, and a predetermined gap 125 is obtained between the filter 122 and the housing inner peripheral surface. The first combustion chamber 105a is defined adjacent to a space in which the coolant/filter 122 is installed, and the ignition means including two igniters (12a, 12b) is concentrically arranged adjacent to the first combustion chamber 105a. Then, since the annular second combustion chamber 105b is defined in the radial direction of the ignition means, the first combustion chamber 105a and the second combustion chamber 105b are provided adjacent to each other in the axial direction of the housing 103. The different gas generating agents (9a, 9b) are respectively charged in the first and second combustion chambers, and in the gas generator shown in this drawing, the porous cylindrical first gas generating agent 9a and the single-hole cylindrical second gas generating agent 9b are respectively stored in the first combustion chamber 105a and the second combustion chamber 105b.

The above ignition means comprises the transfer charges which are ignited and burnt according to the activation of the igniters (12a, 12b) and ignites the gas generating agents (105a, 105b) by the flame thereof, and the transfer charges are partitioned for each igniter and independently ignited and burnt at each of the igniters. A space, where the transfer charge partitioned for each igniter is stored, is defined by a cylindrical member, a first transfer charge accommodating chamber 115a, where a first transfer charge 116a is stored, communicates with the first combustion chamber 105a by a flame-transferring hole 119 in a partition wall 107 arranged between the ignition means and the first combustion chamber 105a, and a second transfer charge accommodating chamber 115b, where a second transfer charge 116b is stored, communicates with the second combustion chamber 105b by a flame-transferring hole 117 formed in the cylinder member 104 which defines the accommodating chamber 115b. Then, the first combustion chamber 105a and the second combustion chamber communicate with each other by the through hole 110.

In the gas generator shown in the drawing, when the first igniter 12a is activated, the transfer charge 116a in the first transfer charge accommodating chamber 115a is ignited and burnt, and the flame thereof passes through the flame-transferring hole 119 in the partition wall member 107 and ignites and burns the gas generating agent 9a stored in the first combustion chamber 105a to generate the combustion gas. This combustion gas is purified and cooled while passing through the coolant/filter 122 and is discharged from a gas discharge port 126. On the other hand, when the second igniter 12b is actuated, the transfer charge 116b in the second transfer charge accommodating chamber 115b is ignited and burnt, and the flame thereof ignites and burns the gas generating agent 9b in the second combustion chamber 105b. The combustion gas generated in the second combustion chamber 105b flows inside the first combustion chamber 105a through the through hole 110 in the partition wall 107, purified and cooled while passing through the coolant/filter 122, and then, discharged from the gas discharge port 126.

Further, also in the gas generator shown in this figure, the through hole 110 for bringing the first and second combustion chambers into communication with each other is closed by the seal tape 111 which is broken by the combustion of the gas generating agent in the second combustion chamber exclusively. In the present embodiment also, like the gas generator shown in FIG. 1, a large diameter gas discharge port 126a and a small diameter gas discharge port 126b are provided, and they are closed by the seal tapes 127. That is, in the embodiment shown in FIG. 3, like the embodiment shown in FIG. 1, the thicknesses of the seal tapes are constant, and two kinds of opening areas of the gas discharge ports are provided, thereby making it possible to control the breaking pressure of the seal tape and to always adjust the output in the optimal manner irrespective of combustion timing of the gas generating agents 9a and 9b in the combustion chambers 105a and 105b. The gas discharge ports are formed in the peripheral wall of the cylindrical housing, the surface area of the gas generating agent 9a in the combustion chamber 105a is correlated with the opening area of the gas discharge port 126a, and the surface area of the gas generating agent 9b in the combustion chamber 105b is correlated with the opening area of the gas discharge port 126b. Since the operational principle is the same as that shown in FIG. 1, detailed explanation thereof is omitted.

Further, a communicating hole 161, communicating both chambers, is provided in a sectioning member 160 which partitions the first combustion chamber 105b and the space where the coolant/filter 122 is installed, the combustion gas generated in the first and second combustion chambers (105a, 105b) reaches the space installing the coolant/filter 122 through the communicating hole 161. According to this embodiment, a communicating hole 161 having substantially the same size as an inner diameter of the coolant/filter 122 is formed in the sectioning member 160. Then, a wire mesh 162 is placed in the communicating hole 161 so that the gas generating agent 9a in the first combustion chamber 105a does not move to a side of the space where the coolant/filter 122 is installed, at a time of the combustion. Any kinds of wire mesh can be used for this wire mesh 162 as long as it does not have a mesh size which can prevent the first gas generating agent 9a from moving during the combustion and does not have a draft resistance sufficient to control the combustion performance.

As mentioned above, also in the gas generator according to this embodiment, the gas generating agents (9a, 9b) stored in the respective combustion chambers (105a, 105b) are independently ignited and burnt by adjusting the activation timing of two igniters (12a, 12b), so that the output forms (the actuation performance) of the gas generator can be optionally adjusted. Consequently, in various circumstances such as the speed of the vehicle at a time of collision and an environmental temperature, it is possible to make it most suitable to inflate the air bag in the case of using an air bag apparatus mentioned below.

In FIG. 3, two combustion chambers in the housing are provided adjacent to each other in the axial direction and in the radial direction of the housing. Concretely, in the gas generator shown in FIG. 3, a second combustion chamber 105b is extended in the axial direction of the housing by bending the partition wall 107 which defines a first combustion chamber 105a and ignition means and a second combustion chamber 105b in the axial direction, thereafter forming an end thereof into a flange shape and placing it in contact with an inner periphery of the housing. As a result, in the gas generator shown in FIG. 3, the second combustion chamber is extended in the axial direction, that is, extended to the first combustion chamber side, whereby the first combustion chamber and the second combustion chamber are adjacent to each other in the axial direction and in the radial direction of the housing. In the gas generator shown in FIG. 3, the volume of the second combustion chamber can be made larger, which is advantageous in the case that the second gas generating agent is used in large amount.

Figure 4:
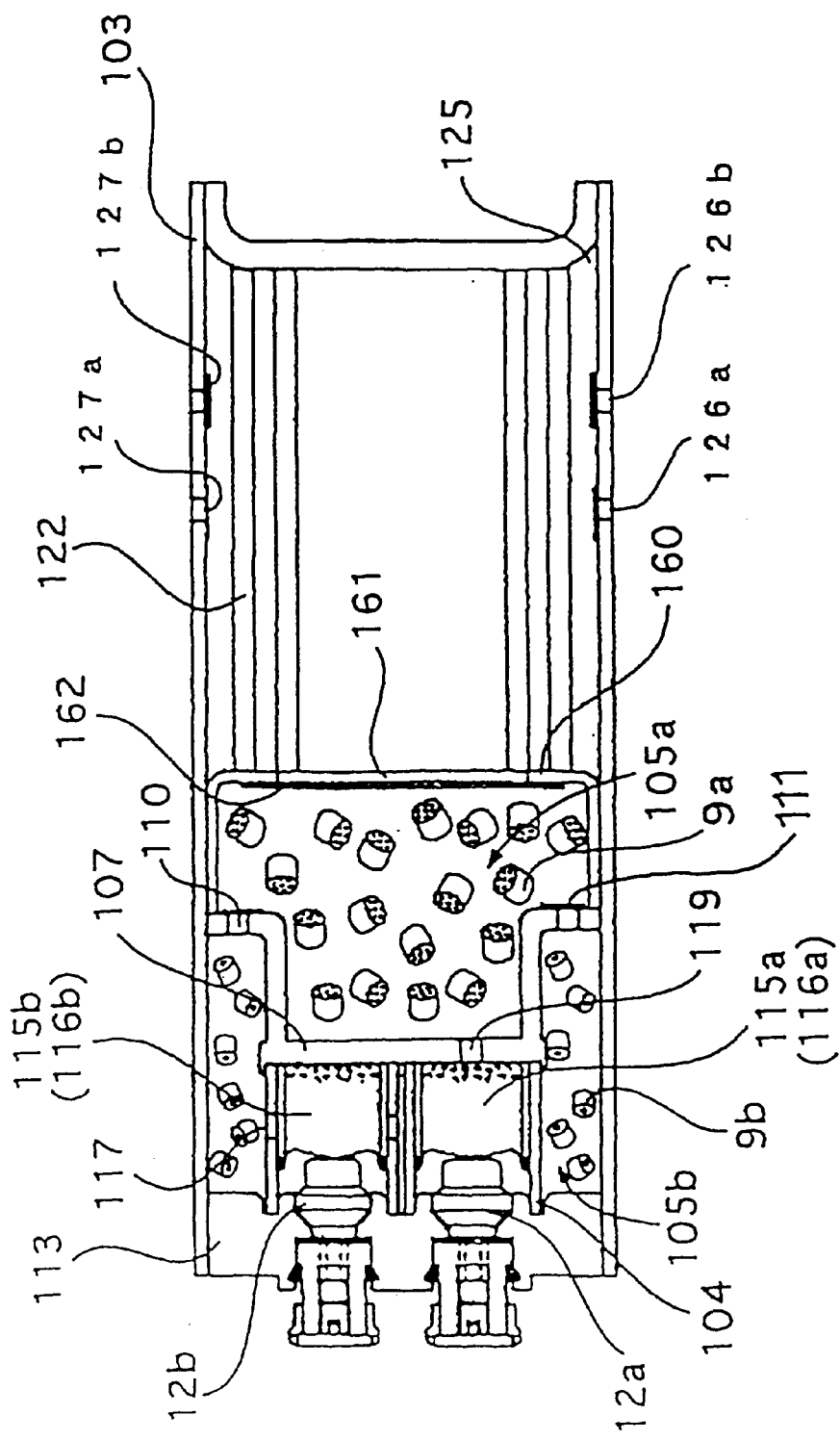
FIG. 4 is a vertical cross sectional view showing yet another embodiment of a gas generator for an air bag of the invention.

FIG. 4 is a vertical cross sectional view of an embodiment of a gas generator for restraining an occupant at a passenger side as in FIG. 3, and shows an embodiment in which opening areas of the discharge ports are constant as shown in FIG. 2, and the thicknesses of the seal tapes are changed to adjust the breaking pressure. That is, the gas discharge port 126a and the gas discharge port 126b are arranged vertically in the axial direction of the housing, and the seal tape 127b for closing the gas discharge port 126b is thicker than the seal tape 127a for closing the gas discharge port 126a. The opening areas (the diameters and the number of holes) of the gas discharge ports 126a and 126b are the same. In the gas generator shown in FIG. 4, the same members as those shown in FIG. 3 are designated with the same numerals, and explanation thereof is omitted. Since the structure and operation of the gas discharge ports and the seal tapes are the same as those shown in FIG. 2, explanation of the operation thereof is omitted.

Also in the case of the gas generator for restraining the occupant at the passenger side as shown in FIGS. 3 and 4, delicate adjustment to reduce the influence by the outside temperature can be realized by further increasing the kinds of opening areas of the gas discharge ports and the kinds of the thicknesses of the seal tapes. Naturally, the opening areas of the gas discharge ports and the thicknesses of the seal tapes may be combined simultaneously.

Embodiment 3

Figure 5:
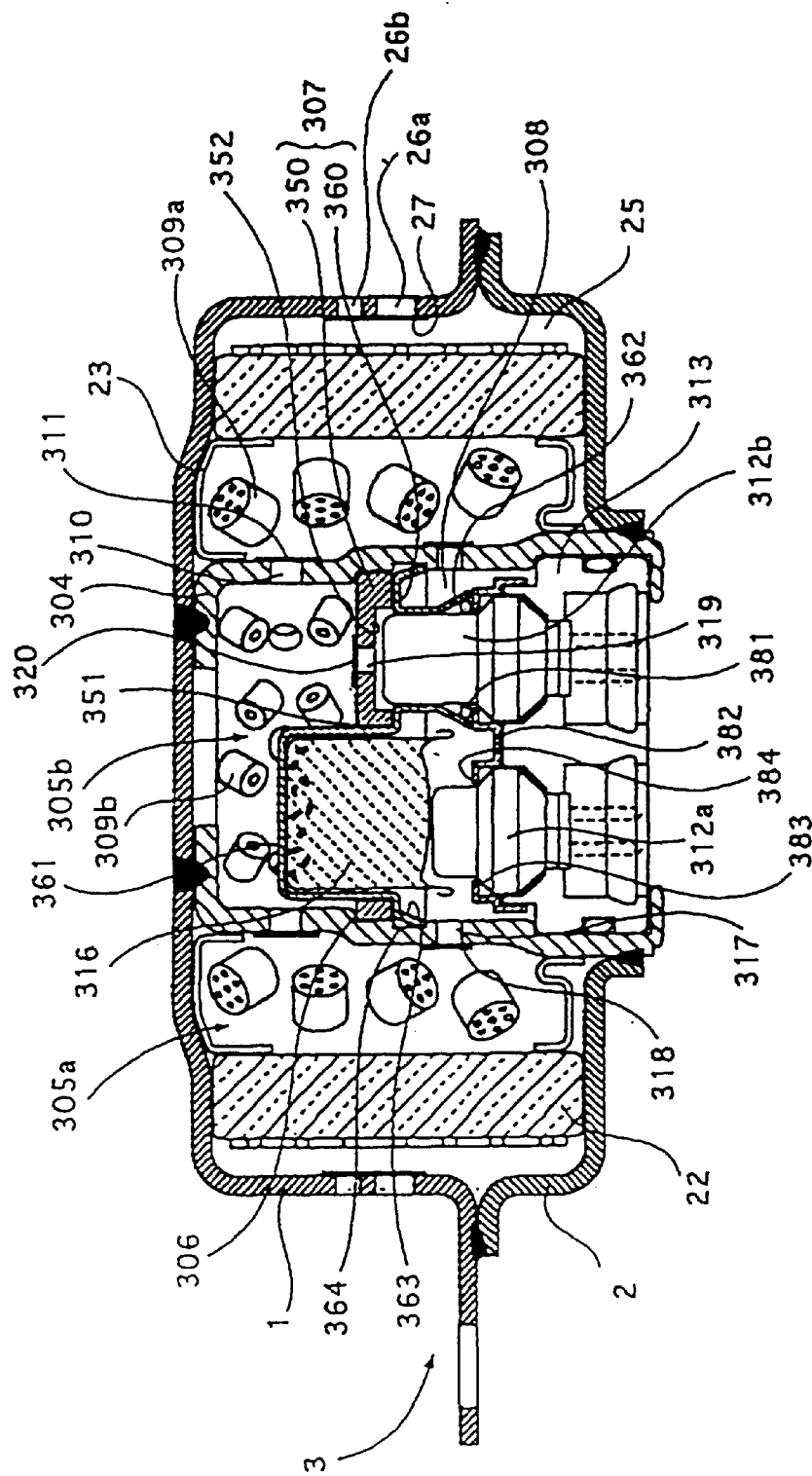
FIG. 5 is a vertical cross sectional view showing another embodiment of a gas generator of the invention.

FIG. 5 is a vertical cross sectional view showing a gas generator for an air bag of the present invention in another embodiment. The gas generator shown in this embodiment also has a structure suitable for being disposed in the driver side like the gas generators shown in FIGS. 1 and 2.

The gas generator shown in FIG. 5 has the same structure as that shown in FIG. 1 except a structure of a partition wall which defines a cylindrical member into a second combustion chamber and an ignition means accommodating chamber. Therefore, the same members as those shown in FIG. 1 are designated with the same numerals, and explanation thereof is omitted.

Figure 6:
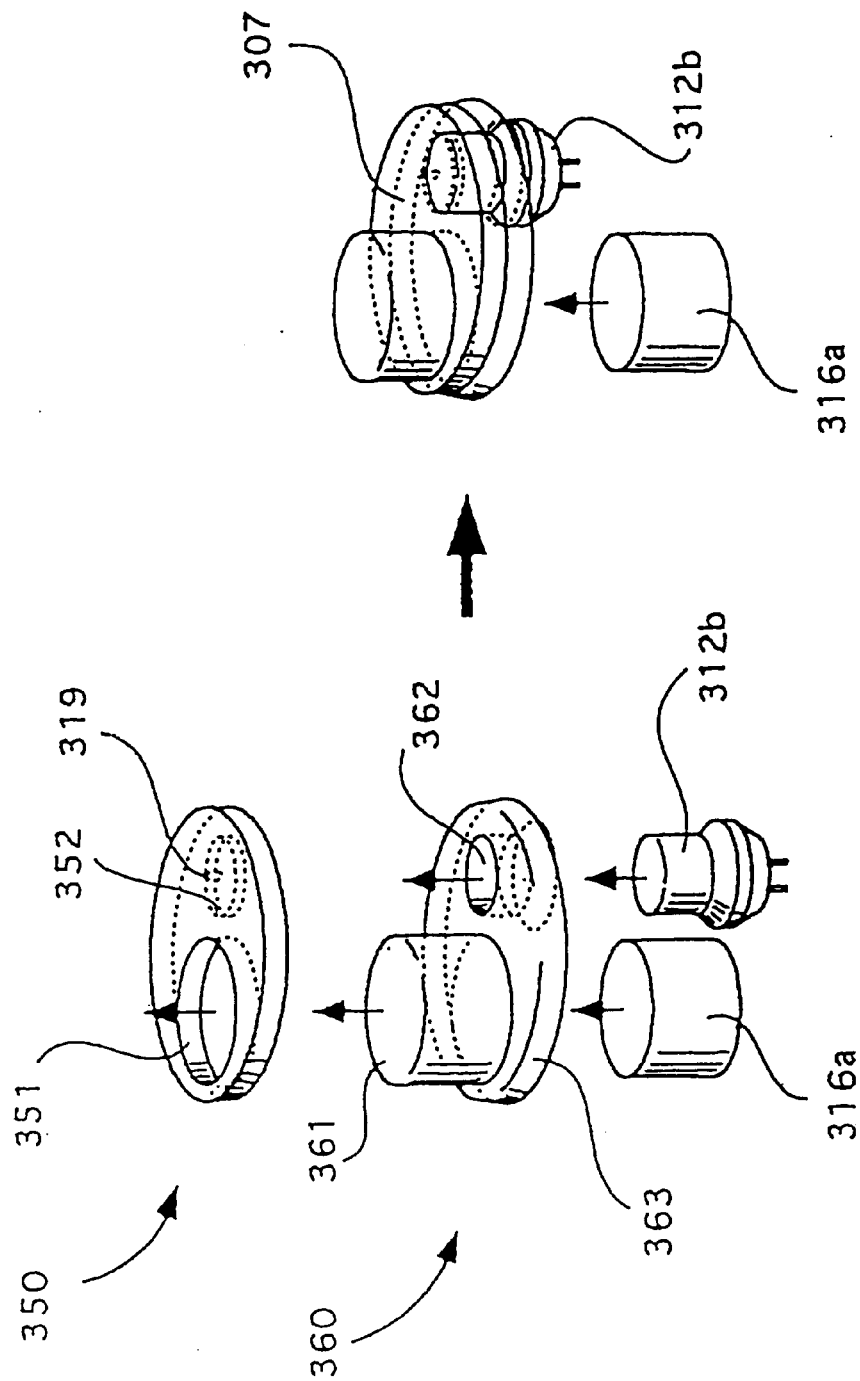
FIG. 6 is an exploded perspective view showing a partition wall.

Particularly in the gas generator shown in this figure, the partition wall 307, having a substantially flat curricular shape, which partitions the interior of the inner cylinder into the second combustion chamber and the ignition means accommodating chamber, is, as shown in an exploded perspective view in FIG. 6, constituted by a sectioning circular member 350 engaged with the stepped notch portion 306 of the inner cylindrical member 304 and a seal cup member 360 engaged with the sectioning circular member 350.

The sectioning circular member 350 is formed in a substantially flat circular shape, and has an opening portion 351 inwardly fitting a transfer charge accommodating portion 361 of a seal cup member 360 mentioned below, a circular hole portion 352 obtained by scraping out a bottom surface in a circular shape and storing an upper portion of an igniter 312b, and a second flame-transferring hole 319 extending and pierced through a substantially center of the circular hole portion. Further, the seal cup member 360 has a cylindrical transfer charge accommodating portion 361 fitted into the opening portion 351 of the sectioning circular member 350 and protruding into the second combustion chamber 305b, and a cylindrical igniter receiving port 362 formed at a position opposing the circular hole portion 352 of the sectioning circular member 350 and extending to a side opposite to the transfer charge accommodating portion 361. A first transfer charge 316a is stored inside the transfer charge accommodating portion 361, and a second igniter 312b is inwardly fitted to the igniter receiving port 362. The sectioning circular member 350 and the seal cup member 360 are engaged with each other by fitting the transfer charge accommodating portion 361 of the seal cup member 360 into the opening portion 351 of the sectioning circular member 350, and an upper portion of the second igniter 312b inwardly fitted to the igniter receiving port 362 exposes into the circular hole portion 352 of the sectioning circular member 350.

The partition wall 307 constituted by the sectioning circular member 350 and the seal cup member 360 is, as shown in FIG. 5, engaged with the stepped notch portion 306 formed on the inner peripheral surface of the inner cylindrical member 304. That is, the peripheral edge of the sectioning circular member 350 is supported at the stepped notch portion 306, and the seal cup member 360 is supported in contact with the sectioning circular member 350. Further, the peripheral edge of the seal cup member 360 is formed by being bent in the same direction as that of the igniter receiving port 362, and a bent portion 363 is fitted into a groove 364 provided on the inner peripheral surface of the inner cylindrical member 304. Accordingly, the sectioning circular member 350 is supported by the seal cup member 360 and is prevented from moving in the axial direction of the housing 3. Further, the partition wall 307 (i.e. the seal cup member 360) and the inner cylindrical member 304 are engaged with each other with no gap by fitting the bent portion 363 in the peripheral edge of the seal cup member 360 into the groove 364 on the inner peripheral surface of the inner cylindrical member 304. Accordingly, in the inner cylindrical member 304, the ignition means accommodating chamber 308 provided in the closure shell side 2 and the second combustion chamber 305b provided in the diffuser shell side 1 are securely partitioned by an ignition means sealing structure comprising a combination of the seal cup member 360 and the groove 364.

The igniter receiving port 362 formed in the seal cup member 360 is structured such that a skirt portion thereof spreads like a fan, and an O-ring 381 is arranged in an inner side thereof, that is, between this and the second igniter 312b stored in the storing port 362, and sealing between the receiving port 362 and the second igniter 312b is performed. And since the O-ring 381 is also press-contacted against an igniter fixing member 382 which fixes two igniters 312a and 312b to the single initiator collar, the second igniter 312b is arranged in a space defined by the circular hole portion 352 of the sectioning circular member, the igniter receiving port 362 of the seal cup member, the O-ring 381 and the igniter fixing member 382. When the seal tape 320 closing the second flame-transferring hole 319 formed in the circular hole portion 352 of the sectioning circular member 350 is ruptured by the activation of the second igniter 312b, the inner portion of the defined space communicates with the second combustion chamber 305b. Then, the first igniter 312a and the second igniter 312b are securely separated by a seal structure comprising the skirt portion of the igniter receiving port 362, the O-ring 381 and the igniter fixing member 382 (hereinafter, referred to as "an igniter seal structure"). Accordingly, the flame generated by the activation of any igniter does not directly flow into the space where the other igniter is stored.

The igniter fixing member 382 is formed in a shape which covers an upper surface of the initiator collar 313, and has a hole portion 384 passing through the upper portion of each igniter and supporting a shoulder portion 383. Two igniters 312a and 312b, arranged in the initiator collar 313, are fixed to the igniter fixing member 382 outwardly fitted to the initiator collar 313. By using the above igniter fixing member 382, two igniters 312a and 312b can be easily assembled to the initiator collar 313. In the gas generator shown in this embodiment, the first igniter 312a and the second igniter 312b are formed in different sizes, and the outputs thereof are different, however, the igniters having the same output may be used.

In the gas generator shown in this drawing also, like the gas generator shown in FIG. 1, opening diameters and/or opening areas of the plurality of gas discharge ports (26a, 26b) formed in the housing are controlled by arranging two kinds or more. As a result, in this gas generator for the air bag, a difference in the maximum internal pressures of the housing at activation of the respective ignition means can be suppressed, the internal pressure at the time of activation of the gas generator can be equalized, and the combustion performance can be stabilized. In the gas generator in this embodiment also, like the gas generator shown in FIG. 2, the opening areas of the gas discharge ports are constant and the thicknesses of the sealing means such as the seal tapes 27 are changed to adjust the breaking pressure, and thereby, a difference in the maximum internal pressures of the housing at activation of the respective ignition means can be suppressed. Further, it is naturally possible to concurrently use the control of the opening diameters and/or opening areas of the gas discharge ports and the control of the thicknesses of the sealing means.

Embodiment 4

Figure 7:
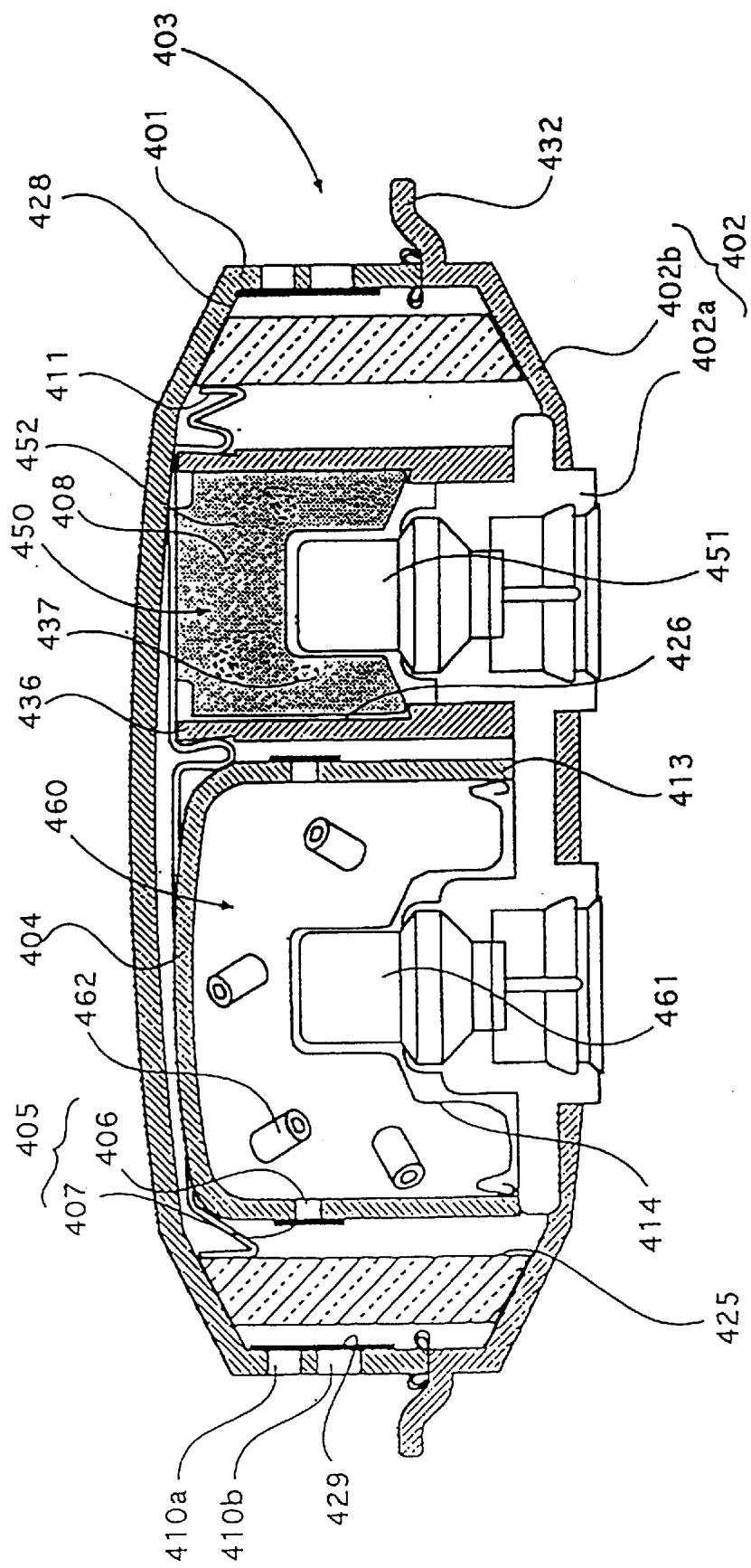
FIG. 7 is a vertical cross sectional view showing yet another embodiment of a gas generator for an air bag of the invention.

FIG. 7 is a vertical cross sectional view which shows a gas generator for an air bag according to another embodiment of the present invention. The gas generator shown in this embodiment also has a structure particularly suitable for being arranged for a driver side in the same manner as that of the gas generator shown in the Embodiments 1 and 3 mentioned above.

In particular, the gas generator shown in this embodiment is characterized by an arrangement of two combustion chambers provided in the housing and a forming method.

Also in the present embodiment, a gas discharge port 410 formed in a diffuser shell 401 has two kinds of gas discharge ports 410a and 410b having different diameters, and these are closed by a seal tape 429 for protecting a gas generating agent 452 from an influence of an environment such as a humidity outside the housing. By providing two kinds of gas discharge ports 410a and 410b having different inner diameters (and opening areas), a combustion internal pressure in the housing 403 at an actuation can be equalized (stabilizing of a combustion performance). Since this actuation was already described in the Embodiment 1, it will be omitted here. A structure of the gas generator according to the present embodiment will be described below.

In the gas generator shown in this embodiment, in a cylindrical housing 403 obtained by joining a diffuser shell 401 having a plurality of gas discharge ports 410 and a closure shell 402 for forming an inner storing space together with the diffuser shell 401 and applying a friction welding to these shells, a cylindrical inner shell 404 in a capsule-like shape having a circle in the horizontal cross section and a closed upper end is arranged and fixed eccentrically with respect to the center axis of the housing, thereby forming a first combustion chamber 450 at an outer side thereof and forming a second combustion chamber 460 in an inner side thereof.

An eccentric degree of the inner shell 404 arranged in the housing 403 with respect to the housing 403 can be suitably changed according to a desired volume ratio of a combustion chamber and the like, and may be changed according to a structure inside the housing 403, for example, whether or not a coolant/filter 425 exists. As an example, like the gas generator shown in this drawing, when the coolant/filter 425 is arranged opposite to a peripheral wall surface of the housing 403, it is possible to suitably select in a range between 10 and 75%. However, since this range can be changed due to the size of the igniters 451 and 461 and the like, the range is only a measure of eccentricity of the inner shell 404 in the gas generator shown in FIG. 7.

The inner shell 404 may be formed in various kinds of shapes such as a rectangular shape, an oval shape, and the like in a horizontal cross section, in order to join easily to the closure shell 402, etc., it is preferable to be formed in a circular shape. In other words, the horizontal cross sectional shape of the inner shell 404 has to be a circular shape when joining the inner shell 404 and the closure shell 402 by a friction welding, and also when joining by a laser welding, it is necessary to keep an emitting distance of the laser constant.

As mentioned above, in this embodiment, the first combustion chamber 450 and the second combustion chamber 460 are defined by the inner shell 404. That is, the first combustion chamber 450 is provided on the outer side of the inner shell 404, and the second combustion chamber 460 is provided on the inner side of the inner shell 404. A volume ratio between the first combustion chamber 450 and the second combustion chamber 460 (a volume of the first combustion chamber:a volume of the second combustion chamber) is set to 3.3:1 in the present embodiment, and it can also be suitably selected in a range of 97:1 to 1:1.1. However, also with respect to the volume ratio, the selected range can be suitably changed due to the size of the igniters (451, 461) and the shape of the gas generating agents (452, 462). Accordingly, the above range shows a range which can be selected in the structure of the gas generator shown in this drawing.

As mentioned above, the gas generating agents (452, 462) are respectively stored in the second combustion chamber 460 and the first combustion chamber 450 which are partitioned by the inner shell 404. The first gas generating agent 452 is stored in the first combustion chamber 450 and the second gas generating agent 462 is stored in the second combustion chamber 460, respectively. In the present embodiment, the first gas generating agent 452 and the second gas generating agent 462 have the same shape or the like. The gas generating agents different from each other in at least one of a burning rate, a composition, a composition ratio, and an amount can be stored in the respective combustion chambers.

The inner shell 404 which defines the first combustion chamber 450 and the second combustion chamber 460 is arranged eccentrically with respect to the center axis of the housing 403, and the second combustion chamber 460, provided inside the inner shell 404, is eccentric with respect to the housing 403. The igniters are respectively arranged in the first combustion chamber 450 and the second combustion chamber 460, the second igniter 461 arranged in the second combustion chamber 460 is disposed in the center of the second combustion chamber 460 which is eccentric with respect to the center axis of the housing 403. Therefore, a flame generated by an activation of the igniter 461 can uniformly burn the second gas generating agent 462. And the second igniter 461 and the first igniter 451 disposed in the first combustion chamber 450 are both arranged eccentrically with respect to the center axis of the housing 403. As mentioned above, by arranging eccentrically the first and second igniters as well as the inner shell 404 with respect to the center axis of the housing 403, a range of a difference in the volume ratio of the first and second combustion chambers can be made larger, and the size of the housing 403 in a diametrical direction can be restricted as much as possible.

Among the igniters arranged in the respective combustion chambers, the igniter 451 arranged in the first combustion chamber 450 has a transfer charge 408 arranged in a peripheral and upper directions thereof. For convenience in assembling the gas generator, or in order to prevent the transfer charge 408 from being scattered in the first combustion chamber 450 due to the impact and the vibration applied at mounting on the vehicle, and to prevent an ignition performance to the first gas generating agent 452 from slipping, the transfer charge 408 is stored in a transfer charge container 426. The transfer charge container 426 is easily broken due to the combustion of the transfer charge 408 arranged therein and formed by an aluminum having a thickness (for example, about 200 μm) to transfer the flame to the periphery thereof. On the other hand, a transfer charge like the one arranged in the first combustion chamber 450 is not necessarily required in the second combustion chamber 460. This is because the second gas generating agent 462 is ignited more easily, than the first gas generating agent 452, and the pressure of the second combustion chamber is increasing in a sealed state until the breaking member 407 for sealing a hole 406 of the below-described inner shell 404 is ruptured. The breaking member 407□is not ruptured even when the internal pressure of the combustion chamber 450 increases due to the combustion of the first gas generating agent 452, but it is ruptured when the internal pressure of the second combustion chamber 460 increases more than that of the first combustion chamber 450. However, the transfer charge can be used as required.

A cylindrical member 436 is placed in the first combustion chamber 450 to surround an outer side in the radial direction of the first igniter 451 and the transfer charge 408 disposed above the igniter. The cylindrical member 436 is formed into a cylindrical shape that opens at both upper and lower ends, one end portion thereof is outwardly fitted to an outer periphery of a portion fixed with the igniter 451 so that no gap is formed. The other end portion is inserted to be supported by a retainer 411 disposed near an inner surface of a ceiling portion of the diffuser shell 401 to be fixed to a predetermined portion. A plurality of flame-transferring holes 437 are formed on a peripheral wall of the cylindrical member 436, and the flame generated by the combustion of the transfer charge 408 is injected from the flame-transferring hole 437 to ignite and burn the first gas generating agent 452 disposed in the outer side of the cylindrical member. It is preferable that the cylindrical member 436 is made of the same material as that of the housing 403.

Figure 8:
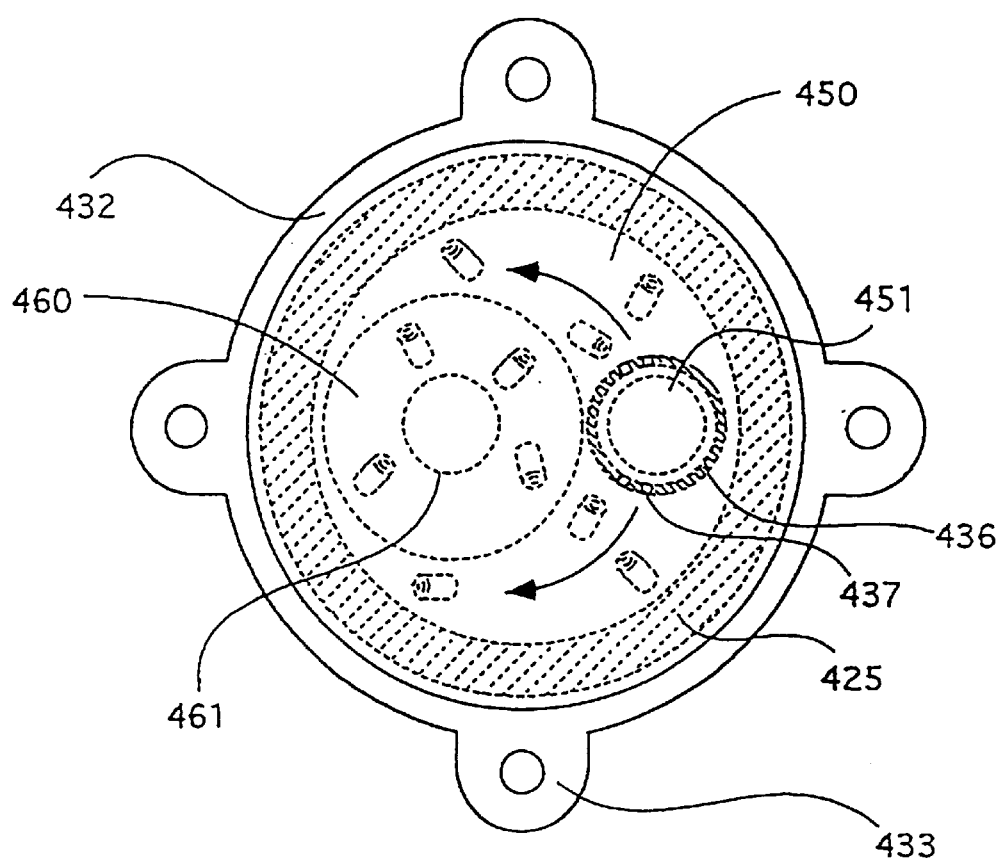
FIG. 8 is a perspective plan view of the gas generator shown in FIG. 7.

In particular, in the gas generator shown in this embodiment, the first combustion chamber 450 is formed into an annular shape similar to a crescent shape obtained by stamping an inner side of a circle roundly, as shown in a perspective plan view in FIG. 8, and the first gas generating agent 452 is placed therein. Accordingly, in the first combustion chamber 450, as is different from the second combustion chamber 460, a distance between the gas generating agent 452 and the igniter 451 is varied with a place for storing the gas generating agent 452. Therefore, at a time of ignition of the igniter 451, the ignition and the combustion of the first gas generating agent 452 are performed unevenly. Then, the flame-transferring hole 437 provided in a peripheral wall of the inner cylindrical member 436 restricts a direction thereof to lead the flame of the transfer charge 408 in a direction shown by an arrow in FIG. 8. Accordingly, it is possible to burn the gas generating agent 452 in a portion shaded by the second combustion chamber 460 (i.e. the inner shell 404) evenly. Further, in place of the inner cylindrical member 436, an injecting-direction restricting means (not shown) having holes formed in a direction shown by an arrow in FIG. 8 can be used. The injecting-direction restricting means restricts the direction of the injecting flame which is generated by the activation of the first ignition means (the igniter 451 and the transfer charge 408 in FIG. 7) for igniting the first gas generating agent 452, in order to effectively burn the first gas generating agent 452. As the injecting-direction restricting means, for example, a cup-like container having one end portion closed by a cylinder member and in which a nozzle for leading the flame of the ignition means in a desired direction (a direction shown by an arrow in FIG. 8) is provided on a peripheral wall portion. In this case, the injecting-direction restricting means is used in a state of being mounted (covered) around the first ignition means. Also in the case of using the above injecting-direction restricting means, it is preferable that the first ignition means arranged inside it comprises the igniter and the transfer charge which is to be ignited and burnt by the activation of the igniter.

The inner shell 404 which defines the first combustion chamber 450 and the second combustion chamber 460 is formed into a capsule shape as mentioned above, and a plurality of opening portions 405 are formed on a peripheral wall thereof. The opening portion 405 is designed such as to be opened only by the combustion of the second gas generating agent 462 stored in the second combustion chamber 460 and is not opened by the combustion of the first gas generating agent 452 stored in the first combustion chamber 450. In the present embodiment, the opening portion 405 comprises a plurality of holes 406 provided in the peripheral wall of the inner shell 404 and the breaking member 407 for closing the hole, and a stainless seal tape is used as the breaking member 407. The breaking member 407 is designed such as to be broken, peeled, burnt, or removed only by the combustion of the second gas generating agent 462 to open the hole 406, but not to be broken by the combustion of the first gas generating agent 452.

The above inner shell 404 is fixed by connecting an open lower portion 413 thereof to the closure shell 402. When the closure shell 402 comprises the collar portion 402a for fixing the igniter, the inner shell 404 can be mounted to the collar portion 402a. In the gas generator shown in FIG. 7, the closure shell 402 is formed such as to integrally joint a circular collar portion having a size capable of fixing two igniters on a bottom surface of the cylindrical shell portion 402b jointed to the diffuser shell 401, and the inner shell 404 is jointed to the collar portion 402a. The collar portion 402a can be integrally formed on the bottom surface of the cylindrical shell portion 402b in a circular shape capable of being fixed at each igniter, and can be integrally formed on the bottom surface of the cylindrical shell portion 402b. In such a case, the inner shell 404 can be directly mounted on the bottom surface of the cylindrical shell portion 402b in addition to the collar portion 402a of the closure shell.

In the present embodiment, a joint of the inner shell 404 and the closure shell 402 can be performed by an uneven joint in addition to a friction welding, a cramping, a resistance welding, and the like. In particular, in the case of joining the both by friction welding, preferably, it is performed in a state of fixing the closure shell 402. Accordingly, even when the axial cores of the inner shell 404 and the closure shell 402 are not aligned to each other, a friction welding can be performed stably. In other words, when friction welding is performed in a state of fixing the inner shell 404 and rotating the closure shell 402, a center of gravity of the closure shell 402 is shifted from a center of rotation and thereby a stable friction welding cannot be performed. Therefore, in the present invention, friction welding is performed in a state of fixing the closure shell 402 and rotating the inner shell 404. Further, at friction welding, it is preferable that the closure shell 402 is positioned and fixed to always mount the inner shell 404 to a predetermined position. Accordingly, it is preferable that positioning means is suitably provided in the closure shell 402. A gas generating agent fixing member 414 is arranged in the inner shell 404 in order to safely and smoothly perform a connection to the closure shell 402. The gas generating agent fixing member 414 is used in order to prevent the gas generating agent 462 from directly contacting with the inner shell 404 at a time of friction welding the inner shell 404 to the closure shell 402 and to obtain a placing space for the igniter 461 inside the space formed by the inner shell 404. When mounting the inner shell 404 to the closure shell 402, in addition to the above friction welding, it is possible to mount by an uneven joint as well as a crimping, a resistance welding, and the like. Also in this case, an assembly performance is improved by using the gas generating agent fixing member 414. The gas generating agent fixing member 414 adopts here a canister made of aluminum and having a thickness which can be easily broken by the combustion of the gas generating agent 462, as one example, and further, a suitable member capable of achieving the object mentioned above (regardless a material, shape and the like) such as a porous member made of a wire mesh. Besides, when the above gas generating agent fixing member 414 is not used, it is possible to form a lump of the gas generating agent obtained by forming a lump of the single-hole cylindrical gas generating agent 462 into the same shape as the inner space of the inner shell 404 and place it in the inner shell 404. In this case, the gas generating agent fixing member 414 may be omitted.

In the present embodiment, the collar portion 402a of the closure shell 402 is formed in a size capable of fixing two igniters 451 and 461 horizontally. Accordingly, two igniters 451 and 461 are previously fixed to the collar portion 402a by crimping, etc., and then, this collar portion 402 is integrally formed with the cylindrical shell portion 402b to form the closure shell 402, and thereby, two igniters 451 and 461 can be fixed to the closure shell 402. In the drawing, the first igniter 451 and the second igniter 461 are described as being the same size, however, they may be structured such as to have a different output at each combustion chamber. Further, in this embodiment, a cable connected to each igniter 451 and 461 to transmit an activating signal is drawn out in the same direction.

A coolant/filter 425 is arranged in the housing 403 as filter means for purifying and cooling the combustion gas generated by the combustion of the gas generating agent. The gases generated by the combustion of the first and second gas generating agents both pass through the coolant/filter 425. In order to prevent a short pass, that is, to prevent the combustion gas from passing between an end surface of the coolant/filter 425 and an inner surface of the ceiling portion of the diffuser shell 401, the upper and lower inner peripheral surfaces of the coolant/filter 425 and the inner surface of the housing may be covered with a cylindrical short-pass preventing member having an inward flange. In particular, in the gas generator shown in FIG. 7, a self-contracting type coolant/filter 425 tapers at both upper and lower ends outwardly in the radial direction. This self-contracting type coolant/filter 425 will be described later with reference to FIG. 11. Also in this embodiment, in the same manner as the gas generator in FIG. 11, a gap 428 which is a flow path for the combustion gas is formed on the outer side of the coolant/filter 425.

As mentioned above, in the gas generator shown in FIG. 7, the igniter (451, 461) and the inner shell 404 are arranged eccentrically with respect to the housing 403. In the above gas generator, when the diffuser shell 401 and the closure shell 402 are joined by friction welding, joining both the shells can be performed stably by fixing the side of the closure shell 402 at the time of friction welding. Particularly, when inner shell 404 is directly mounted to the closure shell 402 by friction welding, as shown in FIG. 7, it is preferable that a flange portion 432 for mounting the gas generator to the module case is provided in the side of the closure shell 402, and a positioning portion is formed in a portion constituting the flange portion 432, for example, a protruding portion 433 or the like by notching the peripheral edge thereof. In case of forming: in this manner, since the closure shell 402 is always fixed in a definite direction on the positioning portion, the inner shell 404 can be securely mounted at a predetermined position.

In the gas generator formed in the above manner, when the first igniter 451 arranged in the first combustion chamber 450 provided on the outer side of the inner shell 404 is activated, the first gas generating agent 452 in the combustion chamber 450 is ignited and burnt to generate the combustion gas. And a little gap is obtained between the inner shell 404 and the coolant/filter 425 and this gap allows a gas flow between the coolant/filter 425 and the inner shell 404, and thereby, the combustion gas can effectively use all the surface of the filter 425. The combustion gas is purified and cooled while passing through the coolant/filter 425, and, thereafter, is discharged from the gas discharge port 410.

On the other hand, when the second igniter 461 arranged in the inner shell 404 is activated, the second gas generating agent 462 is ignited and burnt to generate the combustion gas. The combustion gas opens the opening portion 405 of the inner shell 404 and flows into the first combustion chamber 450 from the opening portion 405. Thereafter, it passes through the coolant/filter 425 as the combustion gas of the first gas generating agent .452 does, and is discharged from the gas discharge port 410. The seal tape 429 which closes the gas discharge port 410 is ruptured by passage of the combustion gas generated in the housing 403. The second gas generating agent 462 is ignited and burnt due to the activated second igniter 461, and is never directly burnt on the combustion of the first gas generating agent 452. This is because the opening portion 405 of the inner shell 404 is opened only by the combustion of the second gas generating agent 462, but not by the combustion of the first gas generating agent 452.

In the gas generator formed in the above manner, the ignition timings of two igniters is adjusted such as to activate the second igniter 461 after activating the first igniter 451, or to simultaneously activate the first igniter 451 and the second igniter 461, and thereby an output forms (an operating performance) of the gas generator can be optionally adjusted so that, under various conditions such as a vehicle speed at a time of collision, an environmental temperature, inflation of the air bag can be made most suitable in the air bag apparatus mentioned below. Particularly, in the gas generator shown in FIG. 7, two combustion chambers are arranged, in the radial direction, whereby a height of the gas generator can be restricted as much as possible.

Also in the gas generator shown in this drawing, in the same manner as the gas generator shown in FIG. 1, a plurality of gas discharge ports 410 formed in the housing 403 are structured such that the opening diameter and/or the opening area thereof are controlled in two or more kinds. Therefore, a difference of the housing maximum internal pressure at the time when each ignition means is activated is suppressed, the internal pressure at the time when the gas generator is actuated is equalized, which provides a gas generator for an air bag having a stable combustion performance. Further, also in the gas generator according to this embodiment, in the same manner as the gas generator shown in FIG. 2, by setting the opening area of each gas discharge port 410 constant but by changing the thickness of the sealing means 429, such as a seal tape, to adjust the breaking pressure, a difference of the housing maximum internal pressure at the time when each ignition means is activated can be suppressed. Further, it is naturally possible to control both of the opening diameter and/or the opening surface in the gas discharge port 410 and the thickness of the sealing means 429.

Other Embodiments

In the gas generator for the air bag shown in Embodiment 1–4 mentioned above, it is possible to additionally provide structures which are optionally made as shown in FIGS. 9–12.

<Embodiment with respect to a through hole of combustion chambers>

Figure 9:
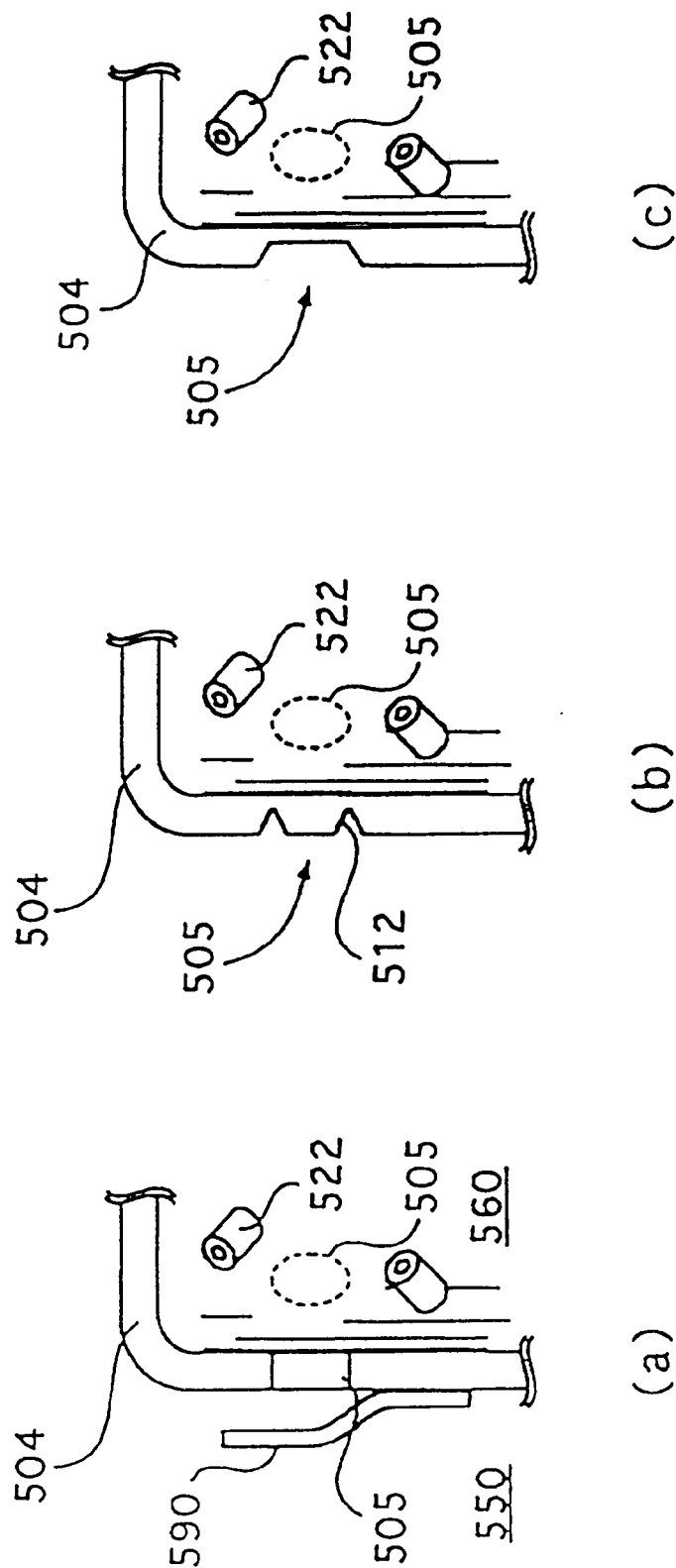
FIG. 9 is a sectional view of an essential portion showing an opening.

FIG. 9 shows another embodiment of an opening portion which is opened by the combustion of the second gas generating agent to communicate the first combustion chamber with the second combustion chamber.

That is, FIG. 9 (a) shows an aspect structured such that an opening portion 505 formed on a partition wall 504 (including an inner shell) which defines a first combustion chamber 550 and a second combustion chamber 560 is covered, from an outer side, with a suitably formed shutting plate 590, which is obtained, for example, by forming a belt-like member into an annular shape, and thereby a combustion flame of the first gas generating agent is not directly contacted. Reference numeral 522 denotes a second gas generating agent. FIG. 9(b) shows an aspect structured such as to form a notch 512 on a peripheral wall of the partition wall 504 to form the opening portion 505. Further, FIG. 9(c) shows an aspect structured such as that a thickness of the peripheral wall of the partition wall 504 is made partly thin to form the opening portion 505.

Accordingly, in the gas generator shown in the above Embodiments 1–4, the opening portion which communicates the first combustion chamber with the second combustion chamber may be formed in the aspect shown in FIG. 9 to communicate the first combustion chamber with the second combustion chamber.

<Embodiment with respect to structure of positioning a igniter and a cable>

Figure 10:
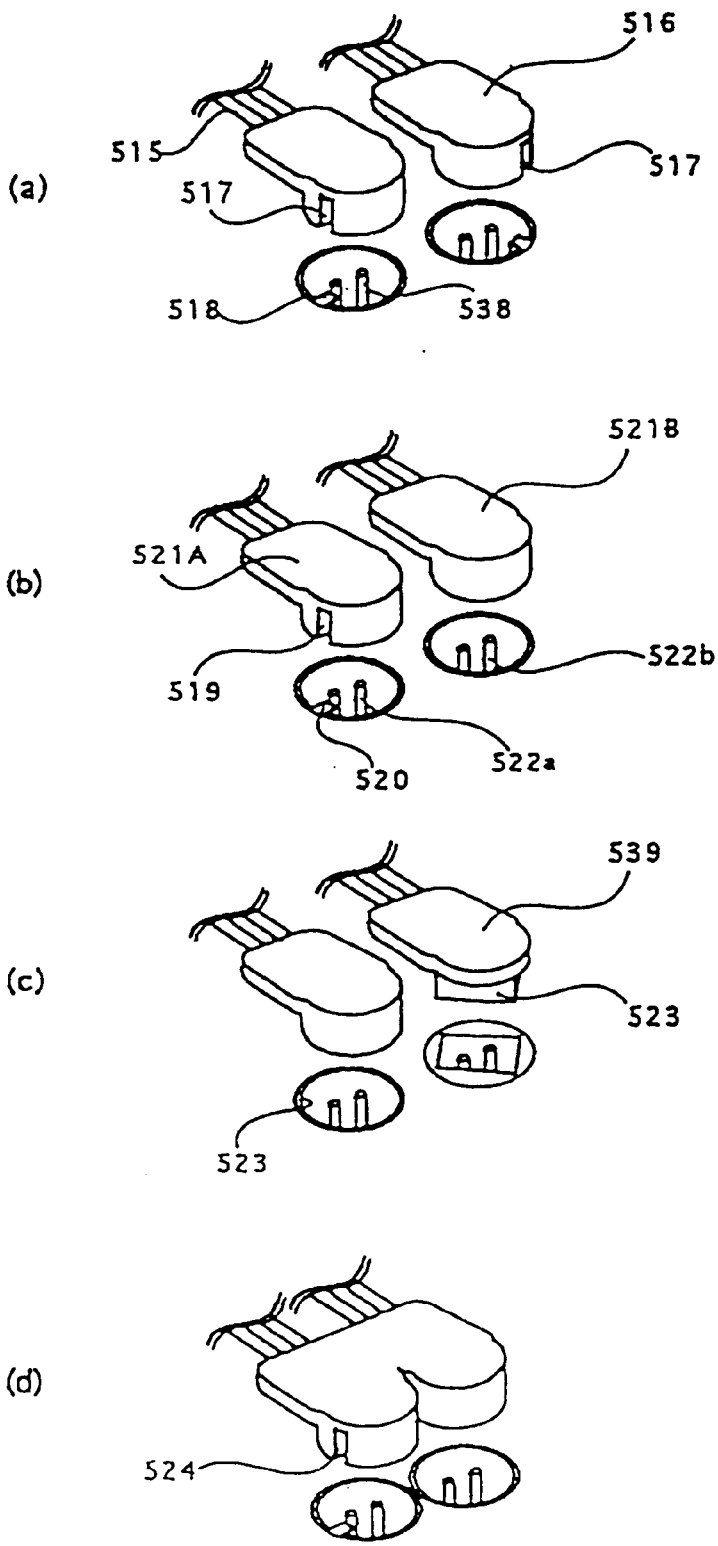
FIG. 10 is a perspective view of an essential portion showing a positioning structure of an igniter and a cable.

FIG. 10 shows the positioning structure of two igniters used in the Embodiment 1–4 and the cable connected to transmit the activating signal to each igniter.

Namely, the gas generators shown in Embodiments 1–4 include two igniters, and usually, a cable 515 for transmitting activation signals is connected to the igniter. In the gas generators shown in Embodiments 1–4, this cable 515 transmits, in some cases, different activation signals to adjust the activating timing of the igniters. In this case, if a wrong cable 515 is connected to the igniter in error, the desired output can not be obtained. Thereupon, the igniter is provided with positioning means so that each of the igniters can be connected to only one of the cables 515, and thereby, connection error can be prevented. Such positioning means can be achieved by using a connector 516 of a respectively different type for each of the igniters as shown in enlarged views of essential portions of FIGS. 10(a) to 10(d). In positioning means shown in FIG. 10(a), the connector 516 is formed with a positioning groove (or projection) 517, and a formed position where a projection (or groove) 518 corresponding to the positioning groove (or projection) 517 is respectively different for each of the igniters 538. That is, positions of the groove (or projection) 517 of each of the connectors 516 is changed so that, if the connector 516 is not mounted in the correct direction, the connectors interfere with each other and they can not be mounted correctly when the connector 516 is mounted to the gas generator. In positioning means shown in FIG. 10(b), only one of connectors 521 is provided with a groove (or projection) 519. Namely, a connector 521A having the groove (or projection) 519 can be jointed to an igniter 522b which is not provided with a projection (or groove) 520, but a connector 521B which is not provided with the groove (or projection) 519 can not be jointed to an igniter 522a having the projection (or groove) 520. As a result, connection error of the connector 521 can easily be found at the time of assembling. FIG. 10(c) shows that shapes of portions 523 to be connected to connectors 539 are different from one another. In FIG. 10(d), two connectors are formed into one, and a positioning groove (or projection) 524 is formed. Other than this, as this positioning means, means for eliminating connection error of the connector can be appropriately employed.

In this manner, in each of the gas generators of Embodiments 1–4, when the positioning means which identifies the cable 515 to be connected to each of the igniters is provided, a gas generator for an air bag capable of more reliably adjusting the activation of a gas generator is realized.

The lead wire connected to each igniter can be, as shown in FIG. 10, taken out in the same direction on the same plane. Particularly, as shown in this drawing, it is preferable to connect each lead wire via the connector and arrange the connectors on the same plane in parallel. The connectors preferably draw out each of the lead wires in a direction perpendicular to an axial direction of the housing and also in the same direction.

<Embodiment with respect to coolant/filter>

Figure 11:
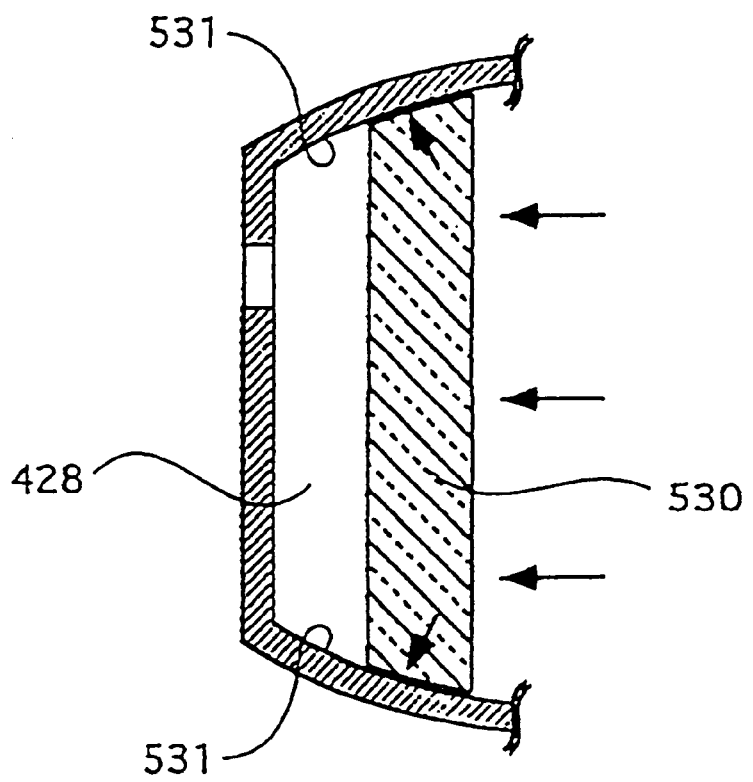
FIG. 11 is a sectional view of an essential portion showing another mode of a coolant/filter.

FIG. 11 relates to a structure of a coolant/filter 530 arranged in the housing and used for purifying and/or cooling the combustion gas generated by the combustion of the gas generating means, and particularly relates to a self-contracting type coolant/filter 530 which can prevent a short pass, that is, prevent the combustion gas from passing between a housing internal surface 531 and the filter 530, in relation to a shape of the housing internal surface 531.

That is, the upper and lower end surfaces of the coolant/filter 530 are inclined so as to be pressed to the outer side in the radial direction and disposed in the housing, being in contact with upper and lower inner surfaces of the housing. At this time, it is preferable that the upper and lower inner surfaces 531 of the housing are formed so as to be inclined in correspondence to an incline of the upper and lower end surfaces of the coolant/filter 530. Consequently, the coolant/filter 530 which is pushed to the outer side in the radial direction by the combustion gas are into contact with the inner surface 531 of the housing, thereby preventing the short pass of the combustion gas between the both members.

<Embodiment with respect to an automatic igniting material (AIM)>

Figure 12:
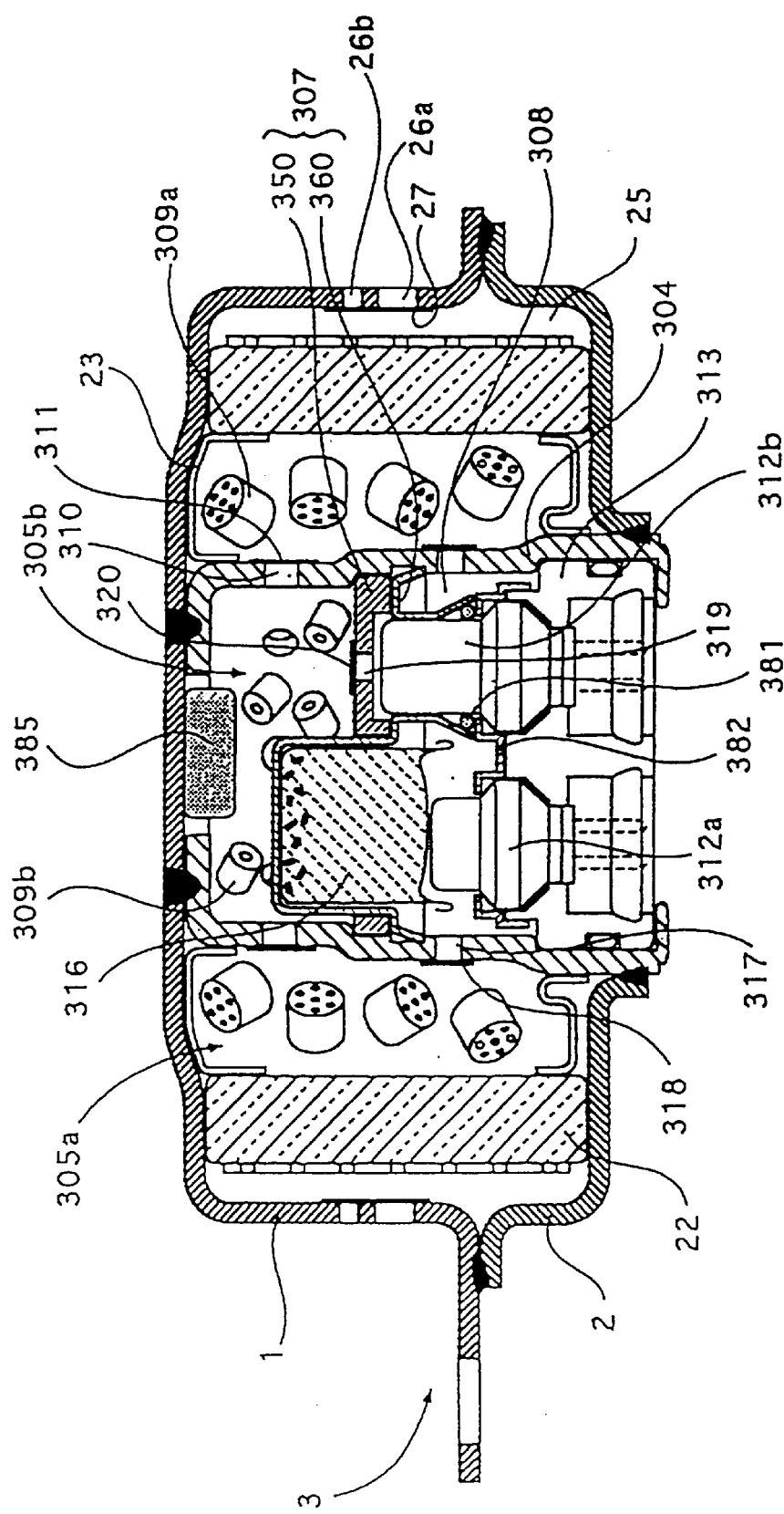
FIG. 12 is a vertical cross sectional view showing a mode in which an automatic ignition material is disposed.

FIG. 12 shows a gas generator for an air bag according to an aspect in which an automatic igniting material (AIM) 385 to be ignited due to a combustion heat of the first gas generating agent 309a transmitted from the housing 1 or the like is stored in the second combustion chamber. The gas generator shown in this embodiment burns indirectly the second gas generating agent 309b stored in the second combustion chamber 305b, due to the combustion of the first gas generating agent, which is left unburned after the actuation of the gas generator when only the first gas generating agent 309a is burnt. This embodiment will be described with reference to the gas generator for the air bag shown in the above Embodiment 3.

Also in the gas generator for the air bag shown in Embodiment 3, the first gas generating agent 309a and the second gas generating agent 309b are generally ignited and burnt independently by the respective activation of the first igniter 312a and the second igniter 312b. Sometimes, only the first igniter is ignited by current and only the first gas generating agent 309a in the first combustion chamber☐305a is ignited and burnt. Namely, the second gas generating agent 309b and the second igniter 312b are left unburned. Since such a case causes a disadvantage at a time of the later operation, disposal and the like, after the actuation of the gas generator (only the first igniter 312a), it is preferable to burn the gas generating agent 309b in the second combustion chamber 305b at a further delayed timing (for example, 100 milliseconds or more) than the normal delayed ignition timing (for example, 10 to 40 milliseconds) for activating the second igniter 312b. Accordingly, as shown in FIG. 12, the automatic igniting material 385 ignited and burnt due to the conduction of the combustion heat of the first gas generating agent 309a can be arranged in the second combustion chamber 305b. In this case, the ignition of the second gas generating agent 309b by the automatic igniting material 385 is performed at a further more delayed time than the predetermined delayed time (that is, an activating interval between the igniters) when normally activating the second igniter 312b after the activation of the first igniter 312a. Namely, it is different from the case of delaying the combustion of the second gas generating agent 309b (i.e. delaying the activation of the second igniter 312b) for the purpose of adjusting the operating performance of the gas generator. The second gas generating agent 309b is not ignited and burnt by the automatic igniting material 385 during optionally delaying the operating current to the second igniter 312b in order to adjust the operating performance of the gas generator, either. Besides, the automatic igniting material 385 can be arranged with being combined with the second igniter.

This embodiment is particularly described on the basis of the gas generator shown in the above Embodiment 3, additionally, in the gas generator shown in Embodiments 1, 2, and 4, the automatic igniting material can be arranged in the second combustion chamber. In this case, even when the second gas generating agent is left unburned after the actuation of the gas generator, the second gas generating agent can be burnt due to the conduction of the heat generated by the combustion of the first gas generating agent.

Embodiment 5

Figure 13:
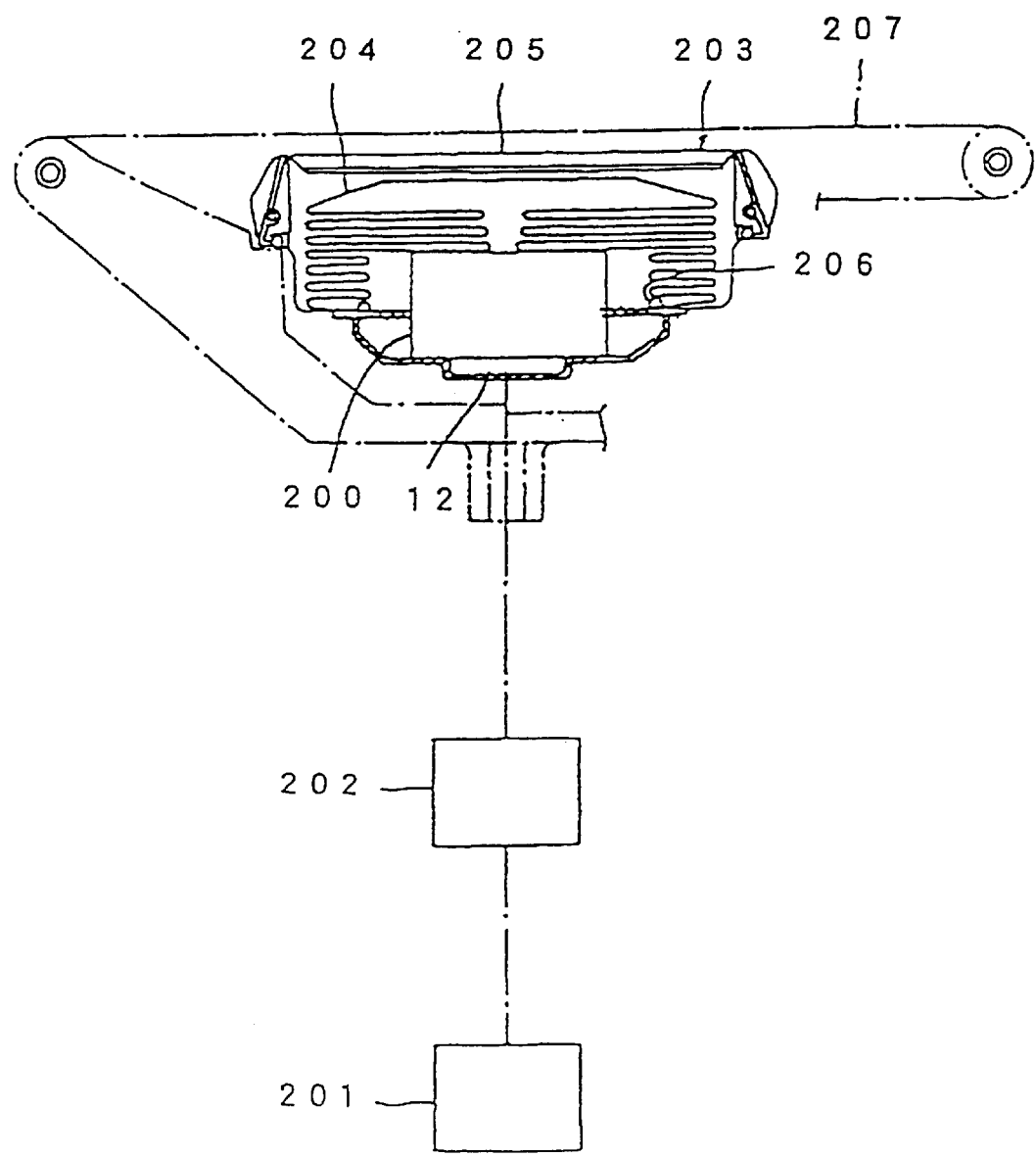
FIG. 13 is a view showing a structure of an air bag apparatus of the invention.

FIG. 13 shows an embodiment of an air bag apparatus according to the present invention in the case of constructing the air bag apparatus in such a manner as to include a gas generator using the electric ignition type ignition means.

The air bag apparatus comprises a gas generator 200, an impact sensor 201, a control unit 202, a module case 203, and an air bag 204. In the gas generator 200, the gas generator described with reference to FIG. 1 is used and the actuation performance thereof is adjusted to apply as a small impact as possible to the occupant at the initial stage of the actuation of the gas generator.

The impact sensor 201 can comprise, for example, a semiconductor type acceleration sensor. This semiconductor type acceleration sensor is structured such that four semiconductor strain gauges are formed on a silicon base plate bent when the acceleration is applied, and these semiconductor strain gauges are bridge-connected. When the acceleration is applied, the beam deflects and a strain is produced on the surface. Due to the strain, a resistance of the semiconductor strain gauge is changed, and the structure is made such that the resistance change can be detected as a voltage signal in proportion to the acceleration.

The control unit 202 is provided with an ignition decision circuit, and the structure is made such that the signals from the semiconductor type acceleration sensor is inputted to the ignition decision circuit. The control unit 202 starts calculation at a time when the impact signal from the sensor 201 exceeds a certain value, and when the calculated result exceeds a certain value, it outputs an activating signal to the igniter 12 of the gas generator 200.

The module case 203 is formed, for example, by a polyurethane, and includes a module cover 205. The air bag 204 and the gas generator 200 are stored in the module case 203 so as to be constituted as a pad module. This pad module is generally mounted to a steering wheel 207 when mounted to a driver side of an automobile.

The air bag 204 is formed by a nylon (for example, a nylon 66), a polyester or the like, and is structured such that a bag port 206 thereof surrounds the gas discharge port of the gas generator and fixed to a flange portion of the gas generator in a folded state.

When the semiconductor type acceleration sensor 201 detects the impact at a time of collision of the automobile, the signal is transmitted to the control unit 202, and the control unit 202 starts calculation at a time when the impact signal from the sensor exceeds a certain value. When the calculated result exceeds a certain value, it outputs the activating signal to the igniter 12 of the gas generator 200. Accordingly, the igniter 12 is activated to ignite the gas generating agent, and the gas generating agent burns and generates the gas. The gas is discharged into the air bag 204, whereby the air bag breaks the module cover 205 to inflate, thereby forming a cushion absorbing an impact between the steering wheel 207 and the occupant.

Embodiment 6

Figure 14:
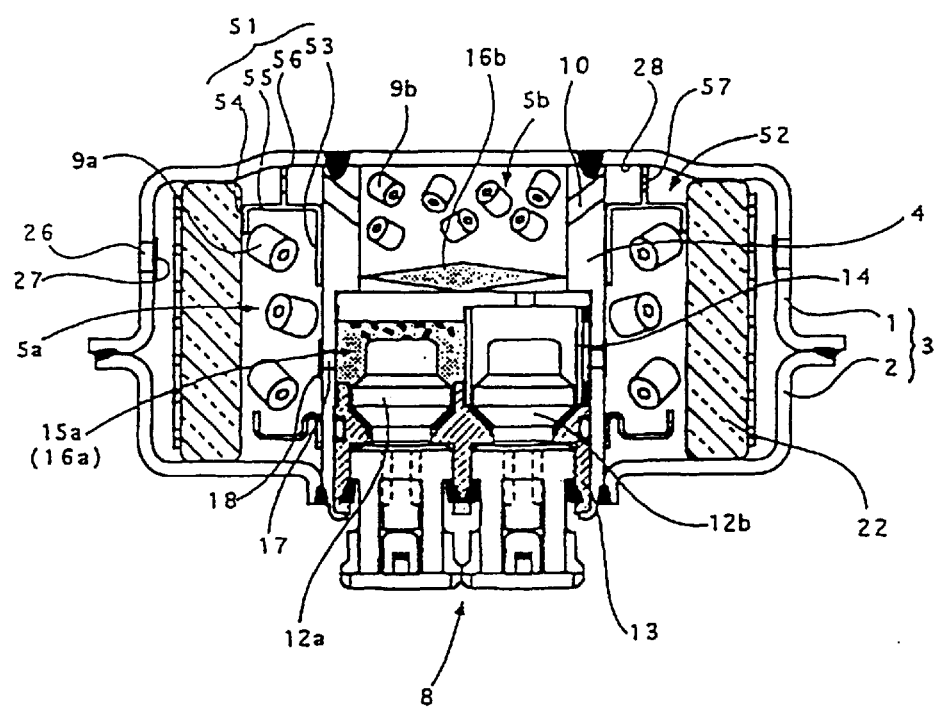
FIG. 14 is a view showing a structure of an air bag apparatus of the invention and showing two passages.

FIG. 14 is a vertical cross sectional view which shows another embodiment of a gas generator for an air bag according to the present invention. The gas generator shown in this drawing is also structured such that it is particularly suitable for being arranged in a driver side. However, a flow passage forming member 51 is arranged in the first combustion chamber 5a, and a flow passage 52 through which the combustion gas generated in the second combustion chamber 5b passes is formed between the flow passage forming member 51 and the ceiling portion inner surface 28 of the diffuser shell.

The flow passage forming member 51 is formed into an annular shape obtained by bending an inner periphery and an outer periphery of a circular member to form an inner peripheral wall 53 and an outer peripheral wall 54, and a supporting wall 56 for forming a space with the ceiling portion inner surface 28 of the diffuser shell is integrally formed on a circular portion 55 connecting the both peripheral wall surfaces. Then, the flow passage forming member 51 holds the inner cylindrical member 4 with the inner peripheral wall 53 thereof and brings a supporting wall 56 in contact with the ceiling portion inner surface 28 of the diffuser shell, whereby a fixed space is obtained between the circular portion 55 and the ceiling portion inner surface 28 of the diffuser shell. Since multiple through holes 57 are formed on the supporting wall, the space can function as a gas flow passage 52. The gas flow passage 52 is communicated with the second combustion chamber 5b by the through hole 10 of the inner cylindrical member 4 due to the combustion of the gas generating agent 9b in the second combustion chamber 5b. Therefore, the combustion gas generated in the second combustion chamber 5b is discharged to the gas flow passage 52 from the through hole 10, passes through the coolant/filter 22 and is discharged from the gas discharge port 26.

What is claimed is:

1. A gas generator for an air bag, comprising:
a housing containing no compressed gas therein and having first and second gas discharge ports;
a first combustion chamber provided in said housing;
a second combustion chamber provided in said housing;
first ignition means and second ignition means attached to said housing, and selectively activated upon an impact;
first gas generating means ignited and burnt only by the activation of said first ignition means to generate a first inflation gas;
second gas generating means ignited and burnt only by the activation of said second ignition means to generate a second inflation gas; and
first and second sealing means for closing said first and second gas discharge ports, respectively,
wherein said first and second sealing means are broken in multiple stages by a breaking pressure due to at least one of a difference in diameters of said first and second gas discharge ports and a difference in thicknesses of said first and second sealing means.

2. A gas generator for an air bag according to claim 1, wherein the first sealing means is broken by an increase in pressure inside said housing due to combustion of one of said first gas generating means: and said second gas generating means, and the second sealing means is broken by an additional increase in the pressure inside said housing due to combustion of another of said first gas generating means and said second gas generating means.

3. A gas generator for an air bag according to claim 1, wherein a ratio A/B of a first breaking pressure A for breaking first sealing means attached to a first gas discharge port and a second breaking pressure B for breaking second sealing means attached to a second gas discharge port is 1.1/1 or greater.

4. A gas generator for an air bag according to claim 1, wherein the breaking pressure is determined by at least one of a diameter of each of said first and second gas discharge ports, and an opening area of each of said first and second gas discharge ports.

5. A gas generator for an air bag according to claim 4, wherein the diameter of at least one of the first and second gas discharge ports is 1 to 8 mm.

6. A gas generator for an air bag according to claim 4, wherein when each of said first and second gas discharge ports has a different diameter, a ratio A/B of the diameter A of the first gas discharge port and the diameter B of the second gas discharge port is 4/1 to 1.1/1 and/or when each of said first and second gas discharge ports has different opening area, a ratio C/D of the opening area C of the first gas discharge port and the opening area D of the second gas discharge port is 97/3 to 3/97.

7. A gas generator for an air bag according to claim 4, wherein the breaking pressure is determined further by the thicknesses of said first and second sealing means.

8. A gas generator for an air bag according to claim 7, wherein a diameter of each of said first and second gas discharge ports is 1 to 8 mm.

9. A gas generator for an air bag according to claim 7 or 8, wherein a ratio A/B of the area A of the first gas discharge port and the area B of the second gas discharge port, sealed by said first and second sealing means having different thickness, is 97/3 to 3/97.

10. A gas generator for an air bag according to claim 1, wherein the breaking pressure is determined by the thicknesses of said first and second sealing means.

11. A gas generator for an air bag according to claim 10, wherein a diameter of at least one of, said first and second gas discharge ports is 1.0 to 8 mm.

12. A gas generator for an air bag according to claim 10 or 11, wherein when each of said first and second sealing means has different thickness, a thickness ratio between said first and second sealing means is 1.1/1 to 12/1.

13. A gas generator for an air bag according to claim 10, wherein a ratio A/B of the area A of the first gas discharge port and the area B of the second gas discharge port, sealed by said first and second sealing means having different thickness, is 97/3 to 3/97.

14. A gas generator for an air bag according to claim 1, wherein each of said first and second sealing means comprises a seal layer having a thickness of 20 $\mu M$ to 200 $\mu m$, and one of a bonding layer and an adhesive layer having a thickness of 5 to 100 $\mu m$.

15. A gas generator for an air bag according to claim 1, wherein said first gas generating means and said second gas generating means are independently ignited by said first ignition means and said second ignition means, and a flame generated by combustion of one of said first gas generating means and said second gas generating means is not transferred to the other of said first gas generating means and said second gas generating means.

16. A gas generator for an air bag according to claim 15, wherein said first gas generating means and said second gas generating means have a different surface area per unit weight.

17. A gas generator for an air bag according to claim 1, wherein said first combustion chamber and said second combustion chamber are concentrically provided so as to be adjacent in a radial direction of the housing, and a communicating hole allowing communication between the first combustion chamber and the second combustion chamber is provided.

18. A gas generator for an air bag according to claim 1, wherein the housing is cylindrical in shape and having an axial core length longer than an outermost diameter thereof, said first combustion chamber and said second combustion chamber being concentrically provided to be adjacent in one of an axial direction and a radial direction of the housing, and a communication hole allowing communication between the first combustion chamber and the second combustion chamber is provided.

19. A gas generator for an air bag according to claim 1, wherein said first ignition means and said second ignition means include a first igniter and a second igniter provided in a single initiator collar.

20. A gas generator for an air bag according to claim 19, wherein said first ignition means and said second ignition means includes a first transfer charge and a second transfer charge ignited and burnt upon activation of the first igniter and the second igniter, respectively the first transfer charge and the second transfer charge are partitioned for each igniter and independently ignited and burnt at each igniter, and the first gas generating means and the second gas generating means are ignited and burnt by flame respectively caused by combustion of the first transfer charge and the second transfer charge in different sections.

21. A gas generator for an air bag according to claim 1, wherein said first ignition means and said second ignition means include a first igniter and a second igniter, respectively activated by electric signals, the first igniter and the second igniter are provided in a single initiator collar, and arranged eccentrically with respect to a center axis of the housing.

22. A gas generator for an air bag according to claim 1, wherein the at least two ignition means include igniters respectively activated by electric signals, lead wires for transmitting the electric signals and connected to the igniters, and wherein the lead wires extend in the same direction and on the same plane.

23. A gas generator for an air bag according to claim 1, wherein they at least two ignition means include igniters respectively activated by electric signals, lead wires for transmitting the electric signals and connected to the igniters via connectors, and wherein the connectors are arranged in the same direction and on the same plane.

24. A gas generator for an air bag according to claim 1, wherein the at least two ignition means include igniters respectively activated by electric signals, lead wires for transmitting the electric signals and connected to the igniters via connectors, and wherein the lead wires extend in the same direction perpendicular to the axial direction of the housing by the connector.

25. A gas generator for an air bag according to claim 1, wherein said first ignition means and said second ignition means include a first igniter and a second igniter respectively activated by electric signals, lead wires respectively connected to the first igniter and the second igniter by connectors for transmitting the electric signals, and wherein each of the connectors has positioning means that permit connection of a selected connector only to a selected igniter.

26. A gas generator for an air bag according to claim 25, wherein the positioning means is integrated into a connector by providing the connector with a shape that matches only the selected igniter.

27. A gas generator for an air bag according to claim 25 or 26, wherein the positioning means is one of a groove and a projection formed in the connector such that the connector matches only the selected igniter.

28. A gas generator for an air bag according to claim 1, wherein an entire combustion gas generated in said second combustion chamber passes through said first combustion chamber and is discharged from said housing through at least one of said first and second gas discharge ports.

29. A gas generator for an air bag according to claim 1, wherein said first and second sealing means are made of a single piece material.

30. An air bag apparatus, comprising:
a gas generator for an air bag, said gas generator having,
a housing containing no compressed gas therein and having first and second gas discharge ports,
a first combustion chamber provided inside said housing, a second combustion chamber provided inside said housing, first ignition means and second ignition means attached to said housing, and selectively activated upon an impact, first gas generating means ignited and burnt only by the activation of the first ignition means to generate a first inflation gas, second gas generating means ignited and burnt only by the activation of the second ignition means to generate a second inflation gas, first and second sealing means for closing said first and second gas discharge ports, respectively, wherein said first and second sealing means are broken in multiple stages by a breaking pressure due to at least one of a difference in diameters of said first and second gas discharge ports and a difference in thicknesses of said first and second sealing means, and wherein the first sealing means is broken by an increase in pressure inside said housing due to combustion of one of the first and second gas generating means and the second sealing means is broken by an additional increase in the pressure inside said housing due to combustion of the other of said first and second gas generating means;

an impact sensor for detecting an impact and activating the gas generator;

an air bag to which a gas generated in the gas generator is introduced to inflate the bag; and a module case for storing the air bag.

31. An airbag apparatus according to claim 30, wherein said first and second sealing means are made of a single piece material.

32. A method of controlling gas generation from an air bag gas generator including a housing, comprising:

providing a housing containing no compressed gas therein and provided with a first gas discharge port and a second gas discharge port;

providing a first combustion chamber inside the housing;

providing a second combustion chamber inside the housing;

hermetically sealing the first gas discharge port by first sealing means;

hermetically sealing the second gas discharge port by second sealing means;

providing first gas generating means for generating a first combustion gas;

providing second gas generating means for generating a second combustion gas;

providing first ignition means that ignites and burns only the first gas generating means;

providing a second ignition means that ignites and burns only the second gas generating means;

breaking the first sealing means by a first internal pressure due to combustion of the first gas generating means to discharge combustion gas; and breaking the second sealing means by a second internal pressure different from the first internal pressure due to combustion of the second gas generating means to discharge the combustion gas, wherein said first and second sealing means are broken in multiple stages by a breaking pressure due to at least one of a difference in diameters of said first and second gas discharge ports and a difference in thicknesses of said first and second sealing means.

33. A method of claim 32, wherein the first gas discharge port has a first open area and the second gas discharge port has a second open area smaller than the first open area.

34. A gas generator for an air bag according to claim 1 or 33, wherein said housing is provided with a plurality of first gas discharge ports having a first total open area and a plurality of second gas discharge ports having a second total open area.

35. A gas generator for an air bag according to claim 34, wherein the first total open area and the second total open area are correlated with total surface areas of said first and second gas generating means, respectively.

36. A gas generator for an air bag according to claim 34, wherein the first total open area and the second total open area are correlated with total weight of the first gas generating means and the second gas generating means, respectively.

37. The method of claim 32, further comprising:

preparing the first sealing means and the second sealing means using a single piece material.

38. A gas generator for an air bag, comprising:

a housing having first and second gas discharge ports;

first ignition means and second ignition means attached to said housing, and selectively ignited upon an impact;

first gas generating means ignited and burnt only by activation of said first ignition means and second gas generating means ignited and burnt only by activation of said second ignition means;

first and second sealing means for closing said first and second gas discharge ports, respectively;

a cylindrical filter provided inside said housing; and a gap provided within said housing and defined by an outer surface of said filter and an inner surface of said housing, wherein said housing contains a first combustion chamber defined by an inner surface of said filter and containing one of said at least two gas generating means, and a second combustion chamber containing another of said at least two gas generating means, wherein said first and second sealing means are broken in multiple stages by a breaking pressure due to at least one of a difference in diameters of said first and second gas discharge ports and a difference in thicknesses of said first and second sealing means, and wherein both a first combustion gas generated in said first combustion chamber and a second combustion gas generated in said second combustion chamber flow into said gap before being discharged from said housing through at least one of said first and second gas discharge ports.

39. A gas generator for an air bag according to claim 38, wherein said first and second sealing means are made of a single piece material.

* * * * *